(12) United States Patent
Lim et al.

(10) Patent No.: US 10,564,738 B2
(45) Date of Patent: Feb. 18, 2020

(54) ELECTRONIC DEVICE INCLUDING DETACHABLE INPUT DEVICE

(71) Applicant: Samsung Electronics Co., Ltd., Gyeonggi-do (KR)

(72) Inventors: Chang-Ok Lim, Gyeonggi-do (KR); Donghee Kim, Gyeonggi-do (KR); Youngmoon Park, Gyeonggi-do (KR); Namhyoung Cho, Gyeonggi-do (KR); Hyun-Seok Chang, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 2 days.

(21) Appl. No.: 15/960,668

(22) Filed: Apr. 24, 2018

(65) Prior Publication Data

US 2018/0307333 A1    Oct. 25, 2018

(30) Foreign Application Priority Data

Apr. 25, 2017  (KR) .......................... 10-2017-0052913

(51) Int. Cl.
| | | |
|---|---|---|
| *G06F 1/16* | (2006.01) | |
| *G06F 3/0362* | (2013.01) | |
| *G04G 21/00* | (2010.01) | |
| *G04G 17/04* | (2006.01) | |
| *G01D 5/14* | (2006.01) | |

(52) U.S. Cl.
CPC ......... *G06F 3/0362* (2013.01); *G04G 17/045* (2013.01); *G04G 21/00* (2013.01); *G06F 1/163* (2013.01); *G01D 5/14* (2013.01)

(58) Field of Classification Search
None
See application file for complete search history.

(56) References Cited

U.S. PATENT DOCUMENTS

| | | | | |
|---|---|---|---|---|
| 6,556,222 B1* | 4/2003 | Narayanaswami | .. | G04G 9/0064 368/295 |
| 6,575,618 B1* | 6/2003 | Inoue | ................... | G01D 5/2451 250/231.13 |
| 7,506,269 B2* | 3/2009 | Lang | ....................... | G06F 1/163 715/786 |
| 7,874,722 B2* | 1/2011 | Clarkson | ............ | G04B 37/1486 368/281 |
| 8,205,370 B2* | 6/2012 | Padgett | .................... | A44C 5/14 40/633 |
| 8,387,412 B2* | 3/2013 | O'Byrne | .............. | A44C 5/0007 24/303 |

(Continued)

FOREIGN PATENT DOCUMENTS

KR    10-2015-0126116 A    11/2015

*Primary Examiner* — Xanthia C Cunningham
(74) *Attorney, Agent, or Firm* — Cha & Reiter, LLC

(57) ABSTRACT

An electronic device according to one embodiment may include: a housing having a first side facing a first direction, a second side facing a second direction opposite to the first direction, and a side surrounding at least a portion of a space between the first side and the second side; a display disposed on the first side of the housing; a detachable input device disposed to surround the display on the first side; and a coupling structure that detachably couples the detachable input device to the housing. Other embodiments may be possible.

16 Claims, 22 Drawing Sheets

(56) References Cited

U.S. PATENT DOCUMENTS

| | | | | |
|---|---|---|---|---|
| 8,511,890 B2* | 8/2013 | Andren | G04G 21/00 368/187 |
| 8,624,836 B1* | 1/2014 | Miller | G06F 1/163 345/157 |
| 8,773,847 B2* | 7/2014 | Byun | H04B 1/385 361/679.03 |
| 8,957,835 B2* | 2/2015 | Hoellwarth | G02B 27/017 345/8 |
| 8,994,827 B2* | 3/2015 | Mistry | H04N 5/2252 348/158 |
| 9,247,119 B2* | 1/2016 | Morisawa | G03B 17/561 |
| 9,411,320 B1* | 8/2016 | Liang | G04R 20/26 |
| 9,551,977 B2* | 1/2017 | Yang | G04B 37/08 |
| 9,753,518 B2* | 9/2017 | Zhou | G06F 1/1637 |
| 9,760,064 B2* | 9/2017 | Kim | G04G 21/00 |
| 9,785,123 B2* | 10/2017 | Mansour | G06F 1/163 |
| 9,791,833 B1* | 10/2017 | Lider | G04B 19/04 |
| 9,829,917 B2* | 11/2017 | Lee | G06F 1/163 |
| 10,013,073 B2* | 7/2018 | Kim | G06F 3/0362 |
| 10,037,642 B2* | 7/2018 | Padgett | H04W 4/80 |
| 10,042,457 B2* | 8/2018 | Kim | G06F 3/0416 |
| 10,082,893 B2* | 9/2018 | Yun | G06F 3/0362 |
| 10,088,809 B2* | 10/2018 | Lee | G04G 21/08 |
| 10,114,514 B2* | 10/2018 | Jo | G02B 27/017 |
| 10,185,414 B2* | 1/2019 | Nam | G04G 17/08 |
| 10,222,750 B2* | 3/2019 | Bang | G04B 19/04 |
| 10,248,227 B2* | 4/2019 | Matsuno | G01C 22/006 |
| 10,250,064 B2* | 4/2019 | Park | H02J 7/025 |
| 10,283,084 B2* | 5/2019 | Broadbent | G01C 21/265 |
| 10,304,271 B2* | 5/2019 | Padgett | H04W 4/80 |
| 2006/0114753 A1* | 6/2006 | Gerber | G04B 19/283 368/295 |
| 2006/0139320 A1* | 6/2006 | Lang | G06F 1/163 345/156 |
| 2007/0008824 A1* | 1/2007 | Cretin | G04B 3/048 368/69 |
| 2009/0056082 A1* | 3/2009 | Quimod | A44B 1/04 24/113 R |
| 2009/0059730 A1* | 3/2009 | Lyons | G04G 21/08 368/69 |
| 2011/0007468 A1* | 1/2011 | Burton | G04F 10/00 361/679.03 |
| 2011/0221688 A1* | 9/2011 | Byun | H04B 1/385 345/173 |
| 2013/0315043 A1* | 11/2013 | Jacobi, Jr. | G04B 19/14 368/228 |
| 2016/0018849 A1* | 1/2016 | Tilney | A45F 5/00 224/267 |
| 2016/0058375 A1* | 3/2016 | Rothkopf | G06F 1/1643 600/301 |
| 2016/0239142 A1* | 8/2016 | Kim | G06F 3/0416 |
| 2016/0252980 A1* | 9/2016 | Park | G06F 3/0362 345/184 |
| 2016/0255733 A1* | 9/2016 | Jung | G06F 1/1633 361/759 |
| 2016/0379604 A1* | 12/2016 | Komulainen | G04G 17/045 345/658 |
| 2018/0063981 A1* | 3/2018 | Park | H05K 5/069 |

\* cited by examiner

ELECTRONIC DEVICE INCLUDING DETACHABLE INPUT DEVICE

CROSS-REFERENCE TO RELATED APPLICATION(S)

This application is based on and claims priority under 35 U.S.C. § 119 to Korean Patent Application No. 10-2017-0052913, filed on Apr. 25, 2017, in the Korean Intellectual Property Office, the disclosure of which is incorporated by reference herein in its entirety.

BACKGROUND

1) Field

Various embodiments disclosed herein generally relate to a detachable input device and an electronic device including the detachable input device.

2) Description of Related Art

Recently, with the development of mobile technology, this technology is increasingly used in every aspect of the users' lives. In particular, as smartphone technology matures, wearable electronic devices are garnering more interest and becoming more popular.

A wearable electronic device is an electronic device that is worn on or attached to the user's body, such as glasses, watches, or other accessories. Wearable devices can be carried on a part of the body of the user, so they can be conveniently used anywhere at anytime and can continuously maintain contact with the user. This portability is particularly useful when other portable devices such as notebooks, telephones, or smartphones are not available.

The above information is presented as background information only to assist with an understanding of the present disclosure. No determination has been made, and no assertion is made, as to whether any of the above might be applicable as prior art with regard to the present disclosure.

SUMMARY

For better portability, wearable devices are limited in size. However, they are still designed to efficiently perform various functions despite their limited sizes. Wearable devices may include a detachable input device (for example, a rotatable wheel and a stem) for user input that are also limited in size. Detachable input devices may be integrally formed with the bodies of wearable electronic devices. As known in the art, it is possible to check whether the detachable input devices are functioning normally only after the detachable input devices are completely assembled with the bodies of the wearable devices. When a defect of the detachable input device is found in the assembly step or the detachable input device fails while the user uses it, it may be difficult to disassemble the wearable device to repair or replace the detachable input device. Further, disassembly of the wearable device may cause additional issues such as scratching and deformation of the various components of the wearable device.

An electronic device according to various embodiments may include: a housing having a first side facing a first direction, a second side facing a second direction opposite to the first direction, and a side surrounding at least a portion of a space between the first side and the second side; a display disposed on the first side of the housing; a detachable input device disposed to surround the display on the first side; and a coupling structure that detachably couples the detachable input device to the housing.

A detachable input device according to an embodiment may include: a first ring-shaped member; a second ring-shaped member rotatably coupled to the first ring-shaped member and rotatable in the circumferential direction of the first ring-shaped member with respect to the outer side of the first ring-shaped member; and one or more elastic members secured to the second ring-shaped member and disposed between the first ring-shaped member and the second ring-shaped member, in which the elastic members may press the first ring-shaped member in the radial direction toward the center of the first ring-shaped member.

According to a wearable electronic device of various embodiments, a detachable input device which can be detached from the body of the wearable electronic device can be provided.

A detachable input device according to various embodiments can be separated from the wearable electronic device and may be individually a discrete device.

According to the various embodiments, since a detachable input device that can be easily attached to and detached from a housing is provided, it is possible to improve the manufacturing process of the electronic device and to allow easy repair the electronic device when malfunctions occur.

According to the various embodiments, it is possible to allow the user to change the external appearance of the electronic device. This may be accomplished by the user when he/she replaces a detachable input device that can be attached to and detached from a housing.

Effects and advantages of the present disclosure are not limited to the above, and other effects and advantages that are not explicitly mentioned may be clearly understood by those skilled in the art from the following description.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
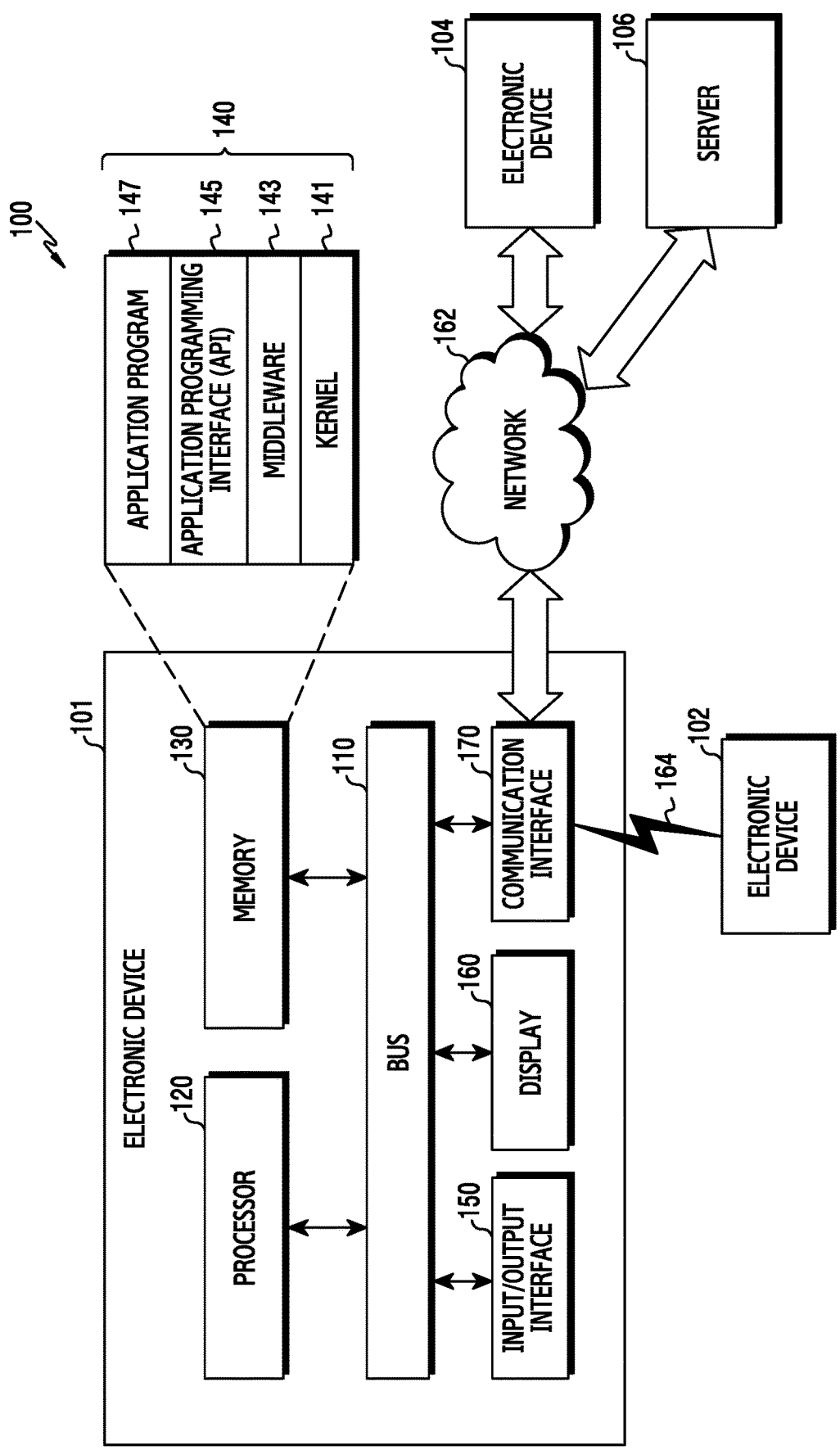
FIG. 1 is a block diagram showing a network environment including an electronic device according to an embodiment.

Hereinafter, various embodiments of the present disclosure will be described with reference to accompanying drawings. However, various embodiments of the present disclosure are not limited to specific disclosed embodiments, and it should be understood that modifications, equivalents, and/or alternatives on the various embodiments described herein can be variously made. With regard to description of drawings, similar components may be marked by similar reference numerals.

In the disclosure disclosed herein, the expressions "have," "may have," "include" and "comprise," or "may include" and "may comprise" used herein indicate existence of corresponding features (for example, elements such as numeric values, functions, operations, or components) and do not preclude the presence of additional features.

In the disclosure disclosed herein, the expressions "A or B," "at least one of A or/and B," or "one or more of A or/and B," and the like used herein may include any and all combinations of one or more of the associated listed items. For example, the term "A or B," "at least one of A and B," or "at least one of A or B" may refer to all of the case (1) where at least one A is included, the case (2) where at least one B is included, or the case (3) where both of at least one A and at least one B are included.

The terms, such as "first," "second," and the like used herein, may refer to corresponding components without implying an order of importance, and are used merely to distinguish each component from the others without unduly limiting the components. Furthermore, such terms may be used to distinguish one element from another element. For example, "a first user device" and "a second user device" indicate different user devices regardless of the order or priority. Without departing from the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to another element or coupled with/to or connected to another element via an intervening element (for example, a third element). In contrast, when an element (for example, a first element) is referred to as being "directly coupled with/to" or "directly connected to" another element (for example, a second element), it should be understood that there is no intervening element (for example, a third element).

According to the situation, the expression "configured to (or set to)" used herein may be used as, for example, the expression "suitable for," "having the capacity to," "designed to," "adapted to," "made to," or "capable of". The term "configured to (or set to)" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (for example, an embedded processor) for performing a corresponding operation or a generic-purpose processor (for example, a central processing unit (CPU) or an application processor) which may perform corresponding operations by executing one or more software programs which are stored in a memory device.

Terms used in the present disclosure are used to describe specified embodiments of the present disclosure and are not intended to limit the scope of other embodiments. Singular expressions may also include the corresponding plural expressions unless otherwise specified. Unless otherwise defined herein, all the terms used herein, which include technical or scientific terms, may have the same meaning that is generally understood by a person skilled in the art. Further, it should be understood that when applicable, terms should be given their contextual meanings in the relevant art. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices (for example, smart glasses, head-mounted-devices (HMDs), electronic apparels, electronic bracelets, electronic necklaces, electronic appcessory, electronic tattoos, smart mirrors, or smart watches).

According to certain embodiments, the electronic devices may be smart home appliances. The smart home appliances may include at least one of, for example, televisions (TVs), digital video disk (DVD) players, audios, refrigerators, air conditioners, cleaners, ovens, microwave ovens, washing machines, air cleaners, set-top boxes, home automation control panels, security control panels, TV boxes (for example, Samsung HomeSync™, Apple TV™, or Google TV™), game consoles (for example, Xbox™ and PlayStation™), electronic dictionaries, electronic keys, camcorders, electronic picture frames, and the like.

According to another embodiment, the electronic devices may include at least one of medical devices (for example, various portable medical measurement devices (for example, a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation electronic devices, global positioning system receivers (GPSs), event data recorders (EDRs), flight data recorders (FDRs), vehicle infotainment devices, electronic equipment for vessels (for example, navigation systems and gyrocompasses), avionics, security devices, head units for vehicles, industrial or home robots, automatic teller's machines (ATMs) of financial institutions, points of sales (POSs) of stores, or internet of things (for example, light bulbs, various sensors, electric or gas meters, sprinkler devices, fire alarms, thermostats, street lamps, toasters, exercise equipment, hot water tanks, heaters, boilers, and the like).

According to a certain embodiment, the electronic devices may include at least one of a part of furniture or buildings/structures, electronic boards, electronic signature receiving devices, projectors, or various measuring instruments (for example, water meters, electricity meters, gas meters, or wave meters, and the like). The electronic devices according to various embodiments may be one or more combinations of the above-mentioned devices. According to a certain embodiment, an electronic device may be a flexible electronic device. Also, electronic devices according to various embodiments of the present disclosure are not limited to the above-mentioned devices, and may include new electronic devices according to technology development FIG. 1 is a block diagram illustrating an example electronic device in a network environment system according to an example embodiment. Referring to FIG. 1, there is illustrated an electronic device 101 in a network environment 100 according to various example embodiments. The electronic device 101 may include a bus 110, a processor 120, a memory 130, an input/output interface 150, a display 160, and a communication interface 170. According to an example embodiment, the electronic device 101 may not include at least one of the above-described elements or may further include other element(s).

The bus 110 may interconnect the above-described elements 120-170 and may include a circuit for transmitting communications (for example, a control message or data) among the above-described elements.

The processor 120 may include various processing circuitry, such as, for example, and without limitation, one or more of a dedicated processor, a central processing unit (CPU), an application processor (AP), or a communication processor (CP), or the like. The processor 120 may perform, for example, an operation or data processing associated with control and/or communication of at least one other element(s) of the electronic device 101.

The memory 130 may include a volatile memory and/or nonvolatile memory. The memory 130 may store commands or data associated with at least one other element(s) of the electronic device 101. According to an example embodiment, the memory 130 may store software and/or a program 140. The program 140 may include, for example, a kernel 141, a middleware 143, an application programming interface (API) 145, and/or an application program (or an application) 147. At least a portion of the kernel 141, the middleware 143, or the API 145 may be called an "operating system (OS)." The kernel 141 may control or manage system resources (for example, the bus 110, the processor 120, the memory 130, and the like) that are used to execute operations or functions of other programs (for example, the middleware 143, the API 145, or the application program 147). Furthermore, the kernel 141 may provide an interface that allows the middleware 143, the API 145, or the application program 147 to access discrete elements of the electronic device 101 so as to control or manage system resources.

The middleware 143 may perform a mediation role such that the API 145 or the application program 147 communicates with the kernel 141 to exchange data. Furthermore, the middleware 143 may process one or more task requests received from the application program 147 according to a priority. For example, the middleware 143 may assign the priority, which makes it possible to use a system resource (for example, the bus 110, the processor 120, the memory 130, or the like) of the electronic device 101, to at least one of the application program 147, and may process the one or more task requests. The API 145 may be an interface through which the application 147 controls a function provided by the kernel 141 or the middleware 143, and may include, for example, at least one interface or function (for example, an instruction) for a file control, a window control, image processing, a character control, or the like.

The input/output interface 150 may include various input/output circuitry and transmit a command or data, input from a user or another external device, to other element(s) of the electronic device 101. Furthermore, the input/output interface 150 may output a command or data, received from other element(s) of the electronic device 101, to a user or another external device.

The display 160 may include, for example, a liquid crystal display (LCD), a light-emitting diode (LED) display, an organic LED (OLED) display, a microelectromechanical systems (MEMS) display, or an electronic paper display, or the like, but is not limited thereto. The display 160 may display, for example, various contents (for example, a text, an image, a video, an icon, and/or a symbol) to a user. The display 160 may include a touch screen and may receive, for example, a touch, gesture, proximity, or hovering input using an electronic pen or a portion of a user's body.

The communication interface 170 may include various communication circuitry and establish communication between the electronic device 101 and an external device (for example, a first external electronic device 102, a second external electronic device 104, or a server 106). For example, the communication interface 170 may be connected to a network 162 through wireless communication or wired communication to communicate with the external device (for example, the second external electronic device 104 or the server 106).

The wireless communication may include cellular communication using at least one of, for example, long-term evolution (LTE), LTE Advanced (LTE-A), code division multiple access (CDMA), wideband CDMA (WCDMA), universal mobile telecommunications system (UMTS), wireless broadband (WiBro), global system for mobile communications (GSM), or the like. According to an example embodiment, as indicated by reference numeral 164 in FIG. 1, the wireless communication may include at least one of wireless fidelity (WiFi), light fidelity (LiFi), Bluetooth, Bluetooth low energy (BLE), Zigbee, near field communication (NFC), magnetic secure transmission, radio frequency (RF), or a body area network (BAN). According to an example embodiment, the wireless communication may include global navigation satellite system (GNSS). The GNSS may include, for example, global positioning system (GPS), global navigation satellite system (Glonass), BeiDou navigation satellite system (hereinafter, referred to as "Bei-Dou") or Galileo, the European global satellite-based navigation system. Hereinafter, "GPS" and "GNSS" may be interchangeably used in the present disclosure. The wired communication may include at least one of, for example, a universal serial bus (USB), a high-definition multimedia interface (HDMI), a recommended standard-232 (RS-232), power line communication, or a plain old telephone service (POTS). The network 162 may include at least one of telecommunications networks, for example, a computer network (for example, local area network (LAN) or wide area network (WAN)), an internet, or a telephone network.

According to an example embodiment, the wired communication may be established by electrically connecting a connector embedded in the electronic device 101 and an external connector embedded in the external electronic device 102. For example, the electronic device 101 may identify the external electronic device 102 connected thereto via the connector. The electronic device 101 may perform various operation flows for controlling signal transmission and reception with the identified external electronic device 102. The electronic device 101 may receive at least one of an analogue signal, a digital signal, or a power source (or power) signal from the external electronic device 102, or may transmit such signals to the external electronic device 102.

The connector may be mounted on a PCB. According to an example embodiment, the PCB may include a first ground having the same potential as that of the connector, and a second ground having a different potential from that of the first ground and physically isolated from the first ground. According to various example embodiments, the second ground may be electrically connected with another conductive portion (for example, a portion of a housing) of the electronic device 101, and the grounds may be extended. When signals or data are exchanged with an external device via the connector, a noise occurring in the connector may be distributed to the first ground, the second ground, or another conductive portion electrically connected with the second ground, and thus may be reduced. This can enhance an electric influence by the connector. For example, a relatively high noise floor from among noises occurring in the connector may be reduced by the second ground or another conductive portion electrically connected with the second ground.

The communication interface 170 may support various types of communication standards related to the connector. According to an example embodiment, the electronic device 101 may be designed to include a USB 3.0 connector or a USB 3.1 connector, or a connector supporting a communication interface of a higher version. For example, when signals or data are exchanged with an external device via the USB 3.0 connector or the USB 3.1 connector, or a connector of a higher version, a relatively high noise floor (for example, a measurement value regarding a sum of noises) may be detected in comparison to a connector supporting low-speed data transmission or low operating frequency. A relatively high noise floor from among noises occurring in the USB 3.0 connector or the USB 3.1 connector, or a connector supporting a communication interface of a higher version may be reduced by the second ground having the different potential from that of the connector or another conductive portion (for example, a portion of the housing) electrically connected with the second ground.

Each of the first and second external electronic devices 102, 104 may be the same or different type of device as or from the electronic device 101. According to various embodiments, all or a portion of operations that the electronic device 101 will perform may be executed by another or plural other electronic devices (for example, the electronic devices 102, 104 or the server 106). According to an example embodiment, when the electronic device 101 should execute any function or service automatically or in response to a request, the electronic device 101 may not perform the function or the service internally, but, alternatively or additionally, it may request at least a portion of a function associated with the electronic device 101 at other device (for example, the electronic device 102, 104 or the server 106). The other electronic device (for example, the electronic device 102, 104 or the server 106) may execute the requested function or additional function and may transmit the execution result to the electronic device 101. The electronic device 101 may provide the requested function or service using the received result or may additionally process the received result to provide the requested function or service. To achieve this, for example, cloud computing, distributed computing, or client-server computing may be used.

Figure 2:
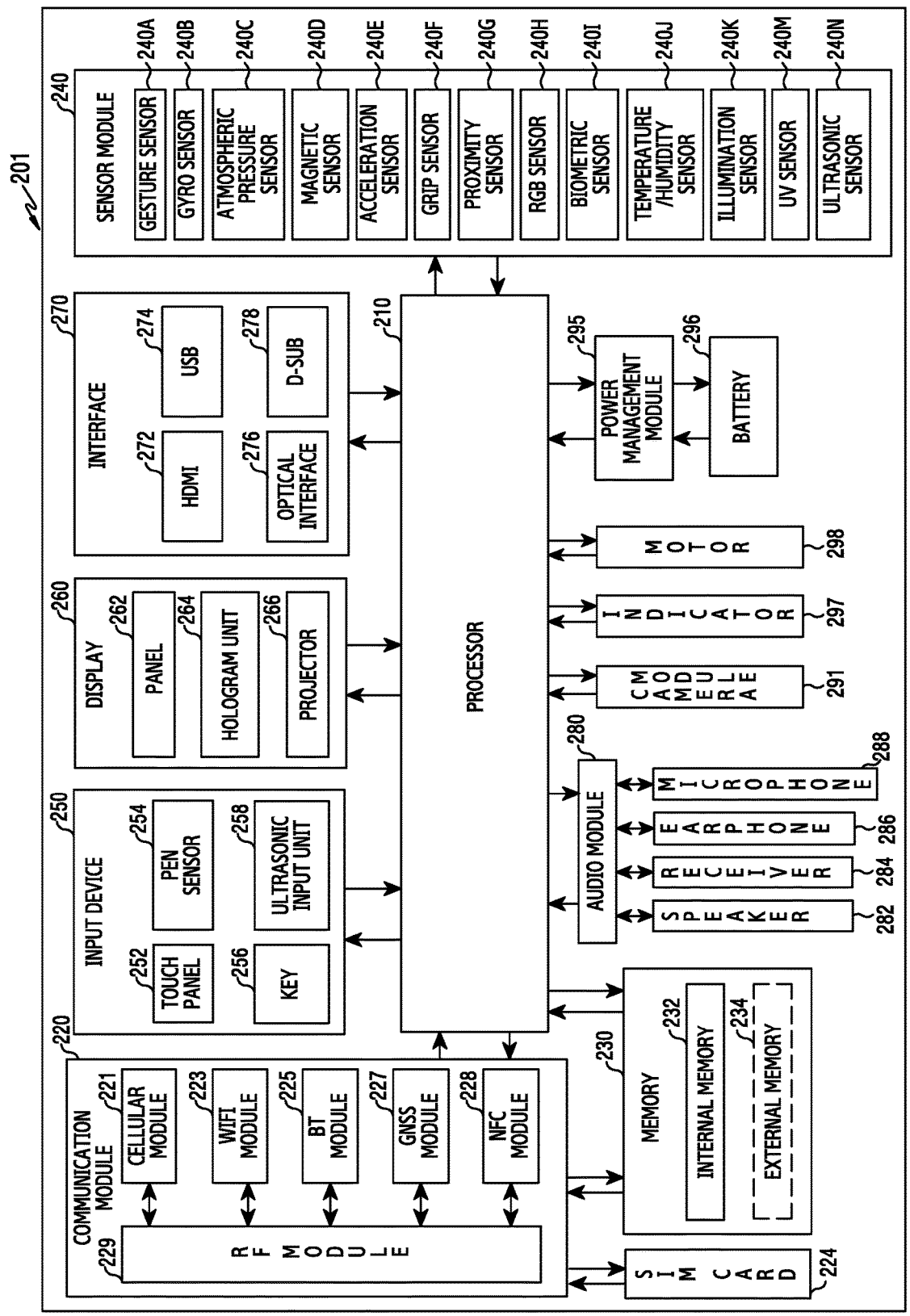
FIG. 2 is a block diagram of an electronic device according to an embodiment.

FIG. 2 is a block diagram of an electronic device 01 according to an embodiment.

The electronic device 201 may include one or more processors (e.g., an application processor (AP)) 210, a communication module 220, a subscriber identification module 224, a memory 230, a sensor module 240, an input device 250, a display 260, an interface 270, an audio module 280, a camera module 291, a power management module 295, a battery 296, an indicator 297, and a motor 298.

In various embodiments, the electronic device 201 does not necessarily include the components of FIG. 2, and can include more or less components than those in FIG. 2. For example, the electronic device 201 according to various embodiments may not include some components according to its type. According to various embodiments, the components of the electronic device 201 can be received in its housing (or a bezel, a main body) or mounted outside the electronic device 201.

The processor 210 may, for example, operate an operating system or an application program, to control a majority of hardware or software constituent elements connected to the processor 210, and may perform various data processing and operations. The processor 210 may be, for example, implemented as a system on chip (SoC). According to an exemplary embodiment, the processor 210 may further include a graphic processing unit (GPU) and/or an image signal processor (ISP). The processor 210 may include at least some (e.g., cellular module 221) of the constituent elements shown in FIG. 2 as well. The processor 210 may load a command or data received from at least one of the other constituent elements (e.g., non-volatile memory) to a volatile memory and process the loaded command or data, and may store the result data in the non-volatile memory.

In various embodiments, the processor 210 can control operations of the electronic device 201. The processor 210 can include one or more processors. For example, the processor 210 can include a CP, an AP, an interface (e.g., General Purpose Input/Output (GPIO)), or an internal memory, as separate components or can integrate them on one or more integrated circuits. According to an embodiment, the AP can perform various functions for the electronic device 201 by executing various software programs, and the CP can process and control voice communications and data communications. The processor 210 can execute a particular software module (an instruction set) stored in the memory 230 and thus carry out various functions corresponding to the module.

In various embodiments, the processor 210 can control hardware modules such as the audio module 280, the interface 270, the display 260, the camera module 291, the communication module 220, and the power management module 295. The processor 210 can be electrically connected with the power management module 295, the display 260, and the memory 230 of the electronic device 201.

According to various embodiments, the processor 210 can process operations for detecting an abnormal battery state (e.g., leakage, failure, etc.). The processor 210 can control to charge the battery having a preset capacity (e.g., a full capacity) up to the preset capacity using a charger circuit, to monitor the battery using a measuring circuit at preset capacities, to obtain first information and second information about the battery at different times based on monitoring results, to determine a battery state based on a difference of the first information and the second information, and to output notification information of the battery based on a determination result.

The processing (or controlling) operations of the processor 210 according to various embodiments shall be elucidated by referring to the drawings.

The communication module 220 may, for example, include a cellular module 221, a WiFi module 223, a Bluetooth module 225, a GNSS module 227, an NFC module 228, and an RF module 229. For example, the communication module 220 may further include a WiGig module (not shown). According to one embodiment, the WiFi module 223 and the WiGig module (not shown) may be integrated into one chip.

The cellular module 221 may, for example, provide voice telephony, video telephony, a text service, an Internet service or the like through a telecommunication network. According to an exemplary embodiment, the cellular module 221 may perform the distinction and authentication of the electronic device 201 within the telecommunication network by using the subscriber identification module (e.g., SIM card) 224. According to an exemplary embodiment, the cellular module 221 may perform at least some functions among functions the processor 210 may provide. According to an exemplary embodiment, the cellular module 221 may include a communication processor (CP).

According to some exemplary embodiment, at least some (e.g., two or more) of the cellular module 221, the WiFi module 223, the Bluetooth module 225, the GNSS module 227 or the NFC module 228 may be included within one integrated chip (IC) or IC package.

The RF module 229 may, for example, transmit and/or receive a communication signal (e.g., an RF signal). The RF module 229 may, for example, include a transceiver, a power amplifier module (PAM), a frequency filter, a low noise amplifier (LNA), an antenna or the like. According to another exemplary embodiment, at least one of the cellular module 221, the WiFi module 223, the Bluetooth module 225, the GNSS module 227 or the NFC module 228 may transmit and/or receive an RF signal through a separate RF module.

The WiFi module 223 may, for example, represent a module for forming a wireless LAN link with a wireless internet connection and an external device. The WiFi module 223 may be embedded or enclosed in the electronic device 201. For example, WiFi, WiGig, WiBro, world interoperability for microwave access (WiMax), high speed downlink packet access (HSDPA), or mmWave (millimeter wave) may be used as the wireless internet technology. The WiFi module 223 may be connected to an external device that is directly connected to the electronic device or via a network (e.g., a wireless Internet network), it is possible to transmit various data of the electronic device 201 to the outside or receive it from the outside. The WiFi module 223 may be kept turned on or turned on/off according to the setting of the electronic device or the user input.

The Bluetooth module 225 and the NFC module 228 may, for example, represent a short range communication module for performing a short range communication. For example, Bluetooth, low power Bluetooth (BLE), radio frequency identification (RFID), infrared communication (IrDA), ultra wideband (UWB), Zigbee, or NFC may be used as the local communication technology. The short-range communication module interworks with an external device connected to the electronic device 201 via a network (e.g., a local area communication network) and may be transmitted to or received from the device. The short range communication module (e.g., Bluetooth module 225 and NFC module 228) may be kept on at all times or turned on/off according to the setting of the electronic device 201 or user input.

The subscriber identification module 224 may, for example, include a card including a subscriber identification module and/or an embedded SIM. And, the subscriber identification module 224 may include unique identification information (e.g., integrated circuit card identifier (ICCID)) or subscriber information (e.g., international mobile subscriber identity (IMSI)).

The memory 230 may, for example, include an internal memory 232 or an external memory 234. The internal memory 232 may, for example, include at least one of a volatile memory (e.g., a dynamic random access memory (DRAM), a static RAM (SRAM), a synchronous dynamic RAM (SDRAM) or the like), and/or a non-volatile memory (e.g., one time programmable read only memory (OTPROM), a programmable ROM (PROM), an erasable PROM (EPROM), an electrically EPROM (EEPROM), a mask ROM, a flash ROM, a flash memory, a hard drive, or a solid state drive (SSD)). The external memory 234 may include a flash drive, for example, a compact flash (CF), a secure digital (SD), a micro-SD, a mini-SD, an extreme digital (xD), a multi media card (MMC), a memory stick or the like. The external memory 234 may be operatively or physically coupled with the electronic device 201 through various interfaces.

In various embodiments, the memory 230 can store one or more programs, data, or instructions allowing the processor 210 to charge the battery having a preset capacity (e.g., a full capacity) up to the preset capacity using a charger circuit, to monitor the battery using a measuring circuit at preset capacities, to obtain first information and second information of the battery at different times based on monitoring results, to determine a battery state based on a difference of the first information and the second information, and to output notification information of the battery based on a determination result.

The memory 230 can include an extended memory (e.g., an external memory 234) or an internal memory (e.g., an internal memory 232). The electronic device 201 may operate in association with a web storage which performs as a storage function of the memory 230 on the Internet.

The memory 230 can store one or more software programs (or software modules). For example, software components can include an OS software module, a communication software module, a graphic software module, a UI software module, an MPEG module, a camera software module, and one or more application software modules (e.g., a battery management module, a battery leakage detection module, etc.). The module which is the software component can be represented as a set of instructions and accordingly can be referred to as an instruction set. The module may be referred to as a program. The memory 230 can include additional modules (instructions) in addition to the above-mentioned modules. Alternatively, if necessary, the memory 230 may not use some of the modules (instructions).

The OS software module can include various software components for controlling general system operations. Such general system operation control can include, for example, memory management and control, and power control and management. The OS software module can also process normal communication between various hardware (devices) and software components (modules).

The communication software module can enable communication with another electronic device, such as a wearable device, a smart phone, a computer, a server, or a portable terminal, through the communication module 220 or the interface 270. Also the communication software module can be configured in a protocol structure corresponding to its communication method.

The graphic software module can include various software components for providing and displaying graphics on the display 260. The term 'graphics' can encompass texts, web pages, icons, digital images, videos, and animations.

The UI software module can include various software components relating to the UI. For example, the UI software module is involved in a status change of the UI and a condition for the UI status change.

The MPEG module can include a software component enabling digital content (e.g., video, audio), processes, and functions (e.g., contents creation, reproduction, distribution, transmission, etc.).

The camera software module can include camera related software components allowing camera related processes and functions.

The application module can include a web browser including a rendering engine, an e-mail application, an instant message application, a word processing application, a keyboard emulation application, an address book application, a touch list, a widget application, a Digital Right Management (DRM) application, an iris scan application, a context cognition application, a voice recognition application, and a location based service. The application module can include an application module for detecting current leakage inside the battery based on at least part of battery voltage or current, and outputting notification information to the user.

The sensor module 240 may, for example, measure a physical quantity or sense an activation state of the electronic device 201, to convert measured or sensed information into an electrical signal. The sensor module 240 may, for example, include at least one of a gesture sensor 240A, a gyro sensor 240B, a barometer 240C, a magnetic sensor 240D, an acceleration sensor 240E, a grip sensor 240F, a proximity sensor 240G, a color sensor 240H (e.g., a red, green, blue (RGB) sensor), a medical sensor 240I, a temperature-humidity sensor 240J, an illumination sensor 240K, or an ultra violet (UV) sensor 240M. Additionally or alternatively, the sensor module 240 may, for example, include an e-nose sensor, an electromyography (EMG) sensor, an electroencephalogram (EEG) sensor, an electrocardiogram (ECG) sensor, an infrared (IR) sensor, an iris scan sensor, and/or a finger scan sensor. The sensor module 240 may further include a control circuitry for controlling at least one or more sensors belonging therein. In some exemplary embodiment, the electronic device 201 may further include a processor configured to control the sensor module 240 as a part of the processor 210 or separately, to control the sensor module 240 while the processor 210 is in a sleep state.

The input device 250 may, for example, include a touch panel 252, a (digital) pen sensor 254, a key 256, or an ultrasonic input device 258. The touch panel 252 may, for example, use at least one scheme among a capacitive overlay scheme, a pressure sensitive scheme, an infrared beam scheme, or an ultrasonic scheme. Also, the touch panel 252 may further include a control circuitry as well. The touch panel 252 may further include a tactile layer, to provide a tactile response (i.e., a touch coordinate) to a user.

The (digital) pen sensor 254 may, for example, be a part of the touch panel 252, or include a separate sheet for recognition. The key 256 may, for example, include a physical button, an optical key, or a keypad. The ultrasonic input device 258 may detect an ultrasonic wave generated in an input tool through a microphone (e.g., a microphone 288), to identify data corresponding to the detected ultrasonic wave. According to various embodiments, the input device 250 can include a digital pen. According to various embodiments, the input device 250 can receive a force touch.

The display 260 may include a panel 262, a hologram device 264, a projector 266, and/or a control circuitry for controlling them.

The panel 262 may, for example, be implemented to be flexible, transparent, or wearable. The panel 262 may be configured as one or more modules along with the touch panel 252. According to an exemplary embodiment, the panel 262 may include a pressure sensor (or force sensor) capable of measuring pressure information (e.g., a pressure coordinate and a pressure intensity) on a user's touch. The pressure sensor may be implemented integrally with the touch panel 252, or be implemented as one or more sensors separate from the touch panel 252.

The panel 262 can be received in the display 260 and detect a user input which contacts or approaches a surface of the display 260. The user input can include a touch input or a proximity input based on at least one of single-touch, multi-touch, hovering, and air gesture. The panel 262 can receive a user input which initiates an operation for using the electronic device 201, and generate an input signal according to the user input. The panel 262 can convert a change such as pressure applied to a particular point of the display 260 or capacitance generating at a particular portion of the display 260, to an electrical input signal. The panel 262 can detect a location or an area of an input means (e.g., a user finger, a digital pen, etc.) which touches or approaches the surface of the display 260. The panel 262 can also detect the pressure (e.g., force touch) of the touch according to the adopted touch method.

The hologram device 264 may show a three-dimensional image to the air by using the interference of light. The projector 266 may project light onto a screen to display an image. The screen may, for example, be disposed inside or outside the electronic device 201.

The interface 270 may, for example, include an HDMI 272, a USB 274, an optical interface 276, or a D-subminiature (D-sub) 278. The interface 270 may, for example, include a mobile high-definition link (MHL) interface, an SD card/multi-media card (MMC) interface, or an infrared data association (IrDA) standard interface.

The interface 270 can receive data from another electronic device, or receive and forward power to the components of the electronic device 201. The interface 270 can send data of the electronic device 201 to another electronic device. For example, the interface 270 can include a wired/wireless headset port, an external charger port, a wired/wireless data port, a memory card port, an audio input/output port, a video input/output port, and an earphone port.

The audio module 280 may, for example, convert a sound and an electrical signal interactively. The audio module 280 may, for example, process sound information that is inputted or outputted through a speaker 282, a receiver 284, an earphone 286, the microphone 288 or the like. The audio module 280 may transmit the audio signal input from the processor 210 to an output device (e.g., a speaker 282, a receiver 284, or an earphone 286). The audio module 280 may transmit an audio signal, such as a voice, received from the input device (ex. the microphone 288) to the processor 210. The audio module 280 may convert audio/sound data into audible sound, may output the converted audible sound through the output device under the control of the processor 210. The audio module 280 may convert the audio signal, such as voice, received from the input device into a digital signal, and may transmit the converted digital signal to processor 210.

The speaker 282 or the receiver 284 may receive audio data from the communication module 220 or stored in the memory 230. The speaker 282 or the receiver 284 may output an acoustic signal related to various operations (functions) performed in the electronic device 201. The microphone 1588 may receive an external acoustic signal and convert to an electrical voice data. The microphone 288 may be implemented with various noise reduction algorithms for eliminating noise generated in receiving an external sound signal. The microphone 288 may be responsible for input of audio streaming such as voice commands or the like.

The camera module 291 may be, for example, a device able to capture a still image and a video. According to an exemplary embodiment, the camera module 291 may include one or more image sensors (e.g., a front sensor or rear sensor), a lens, an image signal processor (ISP), or a flash (e.g., an LED, a xenon lamp or the like).

According to various embodiments, the camera module 291 supports a camera function of the electronic device 201. Under control of the processor 210, the camera module 291 can capture a subject and send the captured data (e.g., an image) to the display 260 and the processor 210. The camera module 291 can include, for example, a first camera (e.g., a color (RGB) camera) for obtaining color information and a second camera (e.g., an IR camera) for obtaining depth information (e.g., location information, distance information of a subject). According to an embodiment, the first camera can be a front camera on a front side of the electronic device 201. The front camera can be replaced by the second camera, and may not be disposed in the front side of the electronic device 201. The first camera can be disposed on the front side of the electronic device 201 together with the second camera. According to an embodiment, the first camera can be a rear camera on a rear side of the electronic device 201. The first camera can include both of the front camera and the second camera on the front side and the rear side respectively of the electronic device 201.

The camera module 291 can include an image sensor. The image sensor can be implemented using a Charged Coupled Device (CCD) or a Complementary Metal-Oxide Semiconductor (CMOS), or the like, without limitation.

The power management module 295 may, for example, manage power of the electronic device 201. According to an exemplary embodiment, the power management module 295 may include a power management integrated circuit (PMIC), a charger IC, or a battery or fuel gauge. The PMIC may employ a wired and/or wireless charging scheme. The wireless charging scheme may, for example, include a magnetic resonance scheme, a magnetic induction scheme, an electromagnetic wave scheme or the like. And, the wireless charging scheme may further include a supplementary circuitry for wireless charging, for example, a coil loop, a resonance circuitry, a rectifier or the like. The battery gauge may, for example, measure a level of the battery 296, a voltage in charge, an electric current or a temperature. The battery 296 may, for example, include a rechargeable battery and/or a solar battery.

The indicator 297 may display a specific state (for example, a booting state, a message state, a charging state or the like) of the electronic device 201 or a part (e.g., the processor 210) of the electronic device 201. The motor 298 may convert an electrical signal into a mechanical vibration, and may generate a vibration, a haptic effect or the like. The electronic device 201 may, for example, include a mobile TV support device (e.g., a GPU) capable of processing media data according to the standards of digital multimedia broadcasting (DMB), digital video broadcasting (DVB), mediaFlo™ or the like.

The constituent elements described in the present document may each consist of one or more components, and a name of the corresponding constituent element may vary according to the kind of the electronic device. In various exemplary embodiments, the electronic device (e.g., the electronic device 201) may omit some constituent elements, or further include additional constituent elements, or combine some of the constituent elements and configure the same as one entity to identically perform functions of the corresponding constituent elements before combination.

Figure 3:
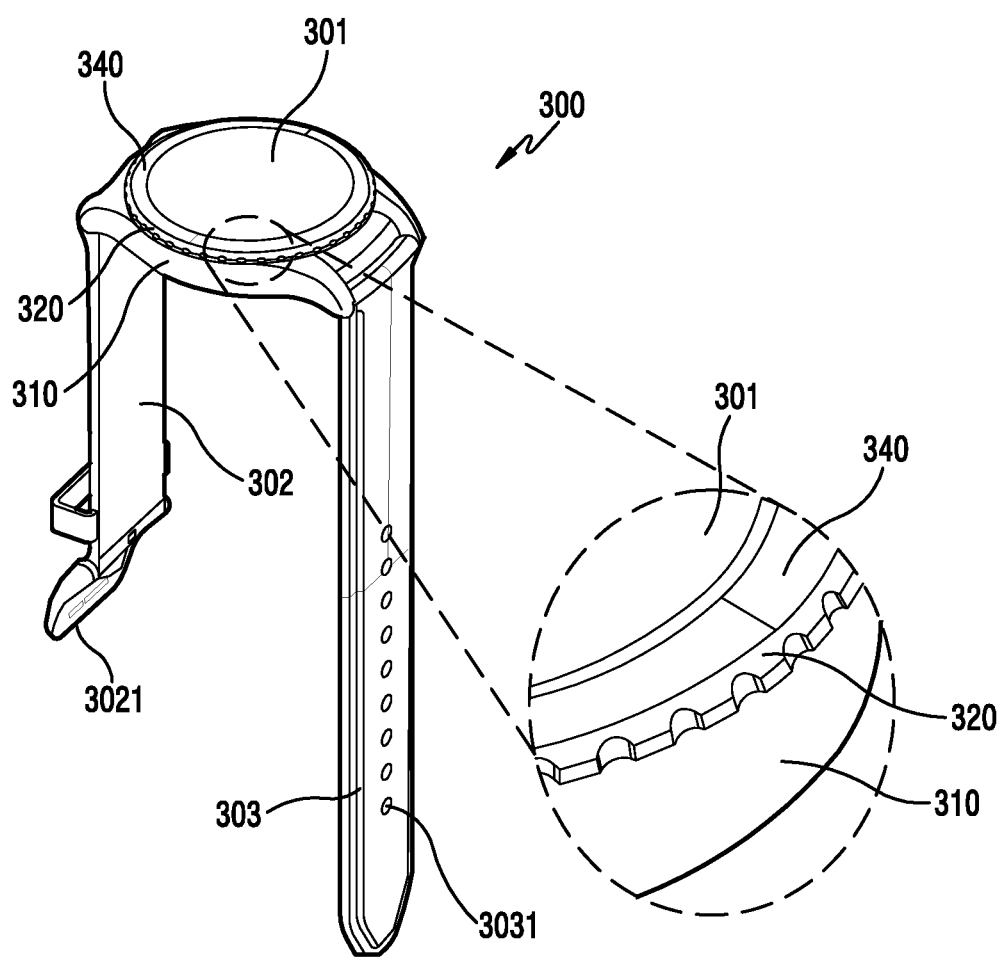
FIG. 3 is an exemplary perspective view of an electronic device according to an embodiment.

FIG. 3 is an exemplary perspective view of an electronic device 300 according to an embodiment.

Referring to FIG. 3, the electronic device 300 according to an embodiment may be an electronic device that a user can wear on a portion of his/her body. For example, the electronic device 300 may be a wrist-wearable electronic device (for example, a watch) that can be worn on a wrist. According to an embodiment, the electronic device 300 may further include a housing 310 that is used as a body and mounting members 302 and 303 that are coupled to at least a portion of the housing 310 so that the electronic device 300 can be detachably mounted on at least a portion of a human body. The mounting members 302 and 303 may include the shape of a band that is wound around the wrist of a human body. For example, the mounting members 302 and 303 may include a strap (for example, a band, a watch strap, a connecting member, or a wearing member).

According to an embodiment, the electronic device 300 can be worn by winding the straps 302 and 303 around a wrist while the housing 310 is in contact with the wrist. A buckle 3021 may be coupled to one strap 302 and one or more adjustment holes 3031 for fastening the buckle 3021 may be formed at the other strap 303. According to an embodiment, the electronic device can be adjusted in position to fit a wrist of a user by fastening the buckle 3021 to one of the adjustment holes 3031. According to another embodiment, the straps of the electronic device 300 may be elastic bands without a specific buckling structure. According to another embodiment, the straps of the electronic device 300 may include a magnetic coupling structure.

The straps 302 and 303 may be made of appropriate materials formed in appropriate shapes. For example, the straps may lengths appropriate for wrapping around a wrist and may be made of at least one material of metal, leather, rubber, silicon, and urethane. According to an embodiment, the straps 302 and 303 may be detachably coupled to the housing 310, so that the user can select various straps 302 and 303 having various designs for the electronic device 300.

The housing 310 may include a display 301. The display 301 may be a touch screen. According to an embodiment, at least one key button (not shown) may be disposed at predetermined positions on the housing 310. For example, the key button may be a push button or a rotary button (for example, a stem) on a side of the housing 310. According to another embodiment, the electronic device 300 may include therein a battery (not shown) (for example, a rechargeable battery) as a power supply and a wireless charging coil (not shown) for charging the battery. In this embodiment, the electronic device may be configured to be mounted on a predetermined portable charging cradle in a specific position to charge the battery.

The electronic device 300 may include a detachable input device (320) (for example, a wheel, a rotary member, or a bezel) rotatably disposed on the housing 310. According to an embodiment, the detachable input device 320 may be disposed to surround the periphery of the display 301 disposed on the housing 310. For example, when the electronic device 300 is a wrist-wearing electronic device, the detachable input device 320 may be a rotatable bezel. Alternatively, the detachable input device 320 may have a circular ring shape. According to an embodiment, the detachable input device 320 can be rotated circumferentially (for example, clockwise or counterclockwise) with respect to the housing 310 (or the display 301). The maximum amount of rotation of the detachable input device 320 may be limited to a predetermined angle with respect to the housing 310. Alternatively, the detachable input device 320 may be configured to be able to continuously rotate in the clockwise or counterclockwise directions. Herein, the detachable input device 320 may be referred to as a replaceable input device or wheel.

The detachable input device 320 may include a decorative member 340 disposed on top around the edge. The decorative member 340 may be made of various materials in various shapes and colors. For example, the decorative member 340 may further include an indication element that is formed by applying paint or is engraved on the top of the decorative member 340 to indicate the amount of rotation. As another example, the decorative member 340 may have a sew tooth shape or at least one groove that provides friction so that a user can easily rotate the detachable input device 320. As another example, the decorative member 340 may be made of a metallic material or a polyester material. The detachable input device 320 according to an embodiment may be detachably coupled to the housing 310. Accordingly, the user can select various detachable input devices having various designs for the electronic device 300.

Though not shown in the figures, the electronic device 300 may include at least one sensor device disposed on or within the housing 310. For example, the sensor device may include various sensors such as a camera sensor, a fingerprint sensor, an infrared sensor, an HRM sensor, a photo sensor, a proximity sensor, a light sensor, and a temperature sensor.

Figure 4:
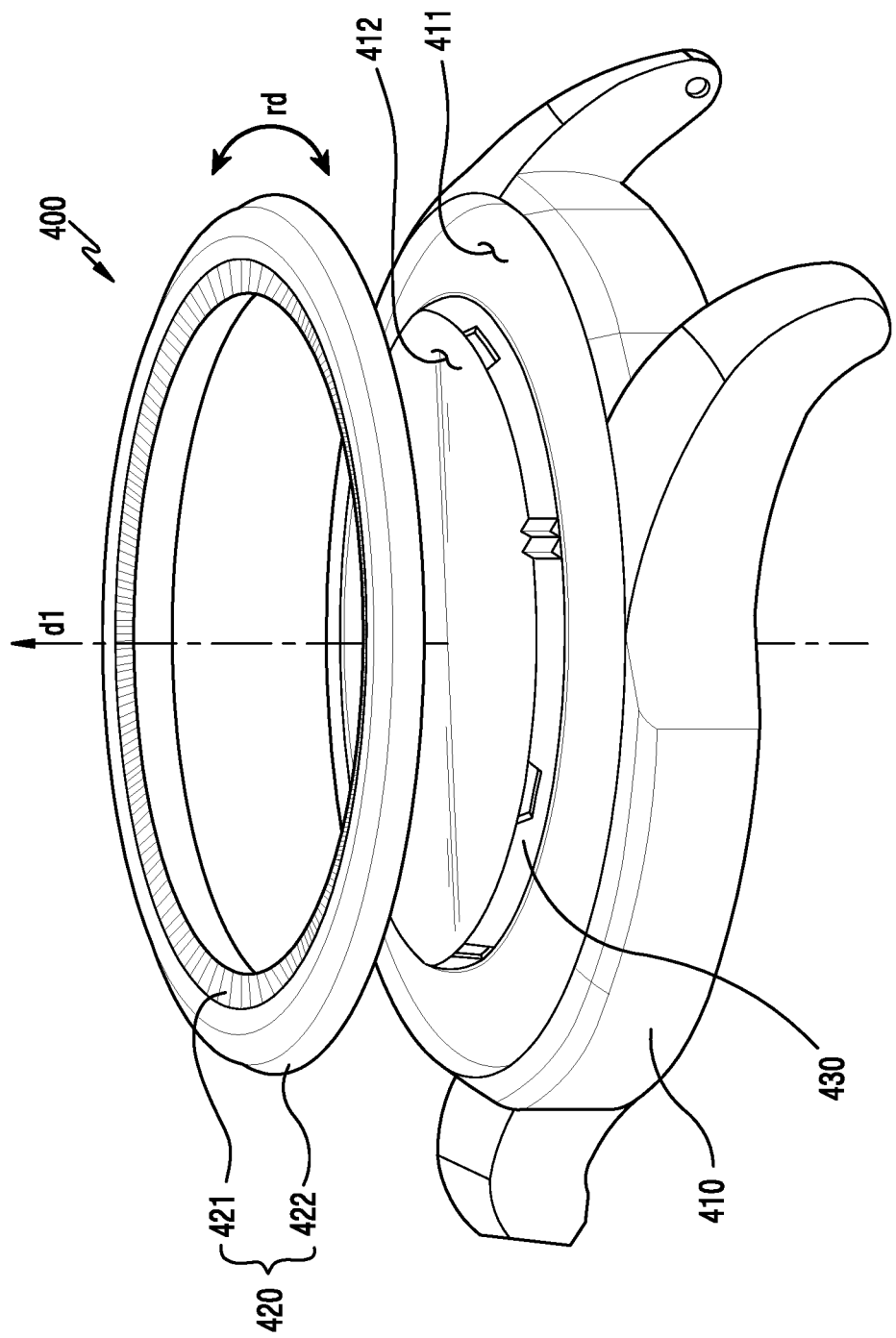
FIG. 4 is a perspective view showing a configuration in which a housing and a detachable input device 420 are separated in an electronic device according to an embodiment.

FIG. 4 is a perspective view showing a configuration in which a housing 410 and a detachable input device 420 are separated in an electronic device 400 according to an embodiment. The electronic device 400 shown in FIG. 4 may be an example that is the same as, similar to the electronic device 300 shown in FIG. 3. Referring to FIG. 4, the electronic device 400 according to another embodiment may include a housing 410 that constitutes the body of the electronic device 400, a detachable input device 420, and a securing member 430. The housing 410 may include a display 412 disposed substantially at the center. For example, the housing 410 may include a circular display 412 disposed at the center on a first side 411, where the first side 411 also has a circular shape.

According to this embodiment, the detachable input device 420 may be disposed on the first side 411 of the housing 410. The detachable input device 420 may be selected to have an appropriate shape and may be made of an appropriate material. For example, the detachable input device 420 may be formed in a ring shape having a sufficient diameter so that it can surround the display 412. The detachable input device 420 may be made of metal, glass, or plastic. According to an embodiment, the detachable input device 420 may include a first ring-shaped member 421 and a second ring-shaped member 422. For example, the detachable input device 420 may be an assembly of the first ring-shaped member 421 and the second ring-shaped member 422. According to an embodiment, the second ring-shaped member 422 may be coupled to the first ring-shaped member 421 so that it can rotate in the circumferential direction rd with respect to the outer side of the first ring-shaped member 421. Accordingly, the first ring-shaped member 421 may be referred to as a reference member and the second ring-shaped member 422 may be referred to as a rotary member. The detachable input device 420 may further include a guide member that guides the second ring-shaped member 422 rotating with respect to the first ring-shaped member 421 and an elastic structure for providing tactile feedback (e.g. a clicking feeling, a locking feeling, or a stopping feeling) during rotation. The guide member and the elastic structure will be described in more detail with reference to FIGS. 8 to 10.

According to this embodiment, the housing 410 may have the securing member 430 disposed around the display 412. For example, the securing member 430 may be a protrusion and a securing ring extending in a first direction d1 from at least a portion of the first side 411. According to an embodiment, the housing 410 and the detachable input device 420 can be combined or separated by a coupling structure provided by the securing member 430. Alternatively, they may be combined or separated by a coupling structure between the securing member 430 and the first ring-shaped member 421. As shown in FIG. 4, the detachable input device 420 can be separated from the housing 410, herein referred to as a separated configuration. Alternatively, the detachable input device 420 can be combined with the housing 410, herein referred to as a combined configuration. In the combined configuration, the first ring-shaped member 421 of the detachable input device 420 may be secured with respect to the housing 410 by being combined with the housing 410. With the first ring-shaped member 421 combined with the housing 410, the second ring-shaped member 422 can rotate in the circumferential direction rd with respect to the outer side of the first ring-shaped member 421. Accordingly, the second ring-shaped member 422 can rotate in the rotational direction rd with respect to the housing 410 or the display 412. Assuming that the first direction d1 is defined as the direction of the central axis, the direction facing the outside from the circumference can be defined as a second direction. The direction opposite to the second direction can be defined as a third direction. The definitions of the first direction, second direction, and third direction may be used for describing various embodiments below.

Figure 5:
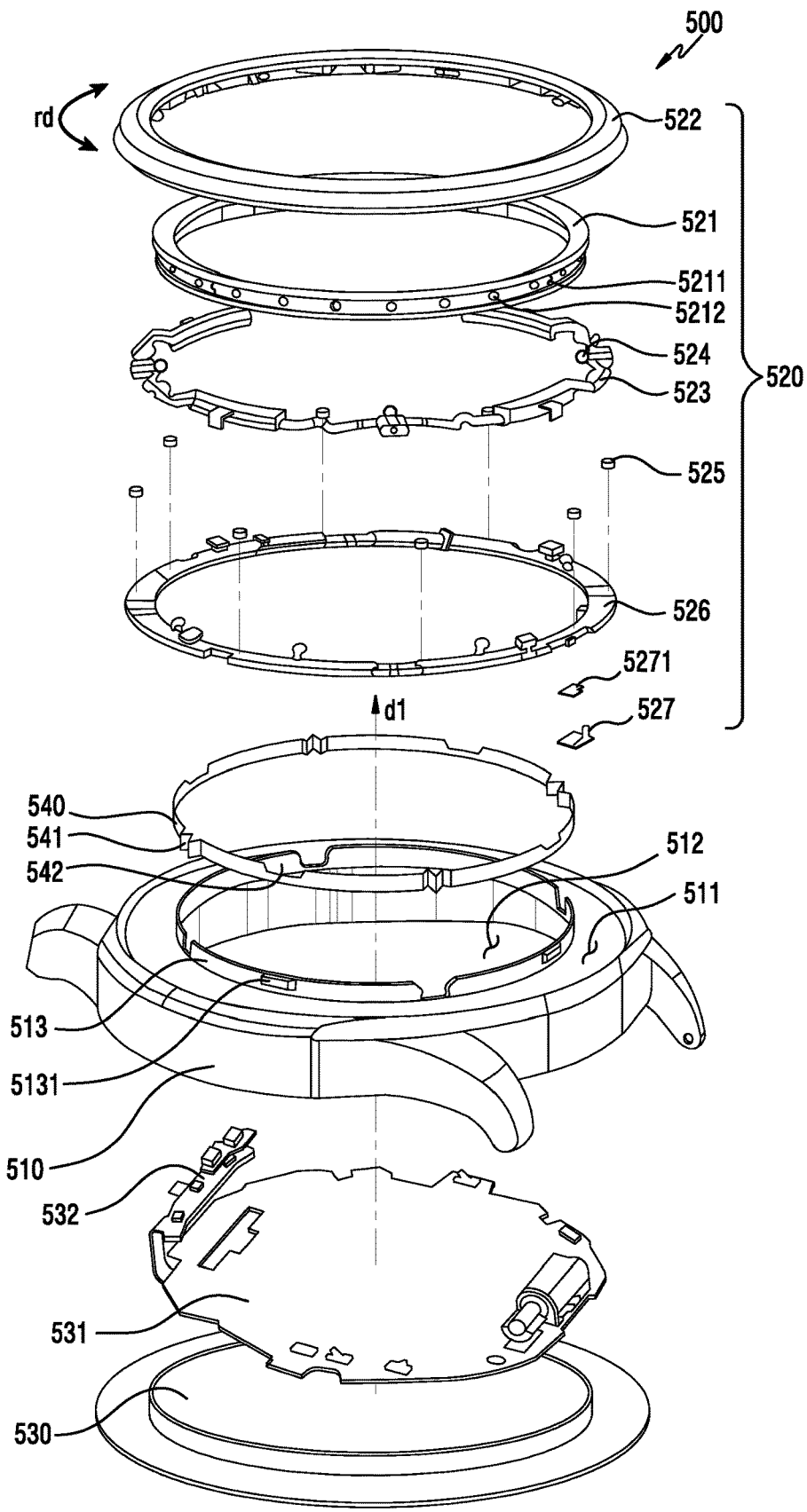
FIG. 5 is an exemplary exploded perspective view of an electronic device according to an embodiment.

FIG. 5 is an exemplary exploded perspective view of an electronic device according to an embodiment. Referring to FIG. 5, an electronic device 500 according to an embodiment may include a front housing 510, a detachable input device 520, a rear housing 530, and a securing ring 540. In alternative embodiments, at least one of the components may be removed or other components may be additionally included.

The electronic device 500 according to this embodiment may include the front housing 510, and the detachable input device 520 and the rear housing 530 that are detachably combined. When the front housing 510 is combined with the rear housing 530, a space is provided therebetween to house the various components of the electronic device 400.

According to this embodiment, the front housing 510 may have a first side 511 facing the first direction d1. An opening 512 may be formed through the first side 511 of the front housing 510. The opening 512 may have an appropriate shape such as a circular shape. However, the opening 512 is not limited thereto and may be formed in an elliptical shape, a rectangular shape, or a polygonal shape. According to an embodiment, the detachable input device 520 may be mounted on the first side 511 to surround the opening 512. The rotatable structure of the electronic device 500 is described hereafter. According to this embodiment, the front housing 510 may have a protrusion 513 extending in the first direction d1 around the edge (i.e. the circumference) of the opening 512. The protrusion 513 may have a plurality of first hooks 5131 protruding radially (i.e. extending away from the center of the opening 512). The first hooks 5131 may be arranged circumferentially at regular intervals on the protrusion 513.

According to this embodiment, the securing ring 540 may formed in a shape corresponding to the protrusion 513. For example, the securing ring 540 may be formed in a ring shape. The securing ring 540 may have a plurality of second hooks 541 arranged circumferentially at regular intervals. The securing ring 540 may have cutouts 542 corresponding to the first hooks 5131 of the protrusion 513 so that the securing ring 540 can be secured in position. According to an embodiment, the securing ring 540 and the protrusion 513 can be fitted to each other. For example, the securing ring 540 and the protrusion 513 may be coupled to each other by fitting the first hooks 5131 of the protrusion 513 in the cutouts 542 of the securing ring 540. That is, the protrusion 513 and the securing ring 540 can be coupled to each other by the cutouts 542 of the securing ring 540 and the first hooks 5131 of the protrusion 513. As another example, the securing ring 540 and the protrusion 513 may be secured to each other by an appropriate adhesive material. According to another embodiment, the protrusion 513 and the securing ring 540 may be not coupled, but integrally formed. According to various embodiments, though not shown in the figures, the electronic device 500 may include a display (for example, 412 in FIG. 4). For example, the display may be disposed over or inside the opening 512. The first hooks 5131 of the protrusion 513 and the second hooks 541 of the securing ring 540 can provide a coupling structure or a rotary structure by which the detachable input device 520 can be coupled to the front housing 510. The coupling structure will be described with reference to FIGS. 6A to 6C.

According to this embodiment, the detachable input device 520 may include a first ring-shaped member 521, a second ring-shaped member 522, a guide member 523, balls 524, magnetic elements 525, and a bottom member 526.

According to this embodiment, the first ring-shaped member 521 may be formed in a shape substantially corresponding to the first side 511 of the front housing 510. For example, the first ring-shaped member 521 may be formed substantially in a ring shape. Accordingly, the first ring-shaped member 521 can be referred to as a first ring. According to an embodiment, the first ring-shaped member 521 may have an outer side 5211 facing the second direction. The outer side 5211 may be referred to as the second side. The first ring-shaped member 521 may have a plurality of stopper holes 5212 arranged at regular intervals on the outer side 5211. The guide member 523 may be coupled to be rotatable with respect to the outer side 5211 of the first ring-shaped member 521. As shown in the figure, the guide member 523 is also formed substantially in a ring shape. However, the guide member 523 may be formed in an appropriate shape that can structurally support the outer side 5211 of the first ring-shaped member 521. The guide member 523 may include the balls 524 arranged circumferentially at regular intervals on the inner side thereof to face the first ring-shaped member 521. The balls 524 may be disposed in contact with the outer side 5211 of the first ring-shaped member 521. The guide member 523 can be rotated in a rotational direction rd with respect to the first ring-shaped member 521 because the balls 524 being in contact with the outer side 5211 of the first ring-shaped member 521 slide on the outers side 5211. Accordingly, the balls 524 may be referred to as bearings.

In other words, according to this embodiment, the guide member 523 may have a third side facing the outer side 5211. The outer side 5211 (or the second side) of the first ring-shaped member 521 may be rotatably fitted to the inner side (or the third side) of the guide member 523. The balls 524 (or the bearings) may be disposed between the second side and the third side. Alternatively, the balls 524 may be disposed on a rotational path for the first ring-shaped member 521 with respect to the guide member 523.

According to this embodiment, the second ring-shaped member 522 may be formed in a shape corresponding to the first side 511 of the front housing 510. For example, the second ring-shaped member 522 may be formed substantially in a ring shape. Accordingly, the second ring-shaped member 522 can be referred to as a second ring. According to an embodiment, the second ring-shaped member 522 may be combined with the assembly of the first ring-shaped member 521 and the guide member 523. For example, the second ring-shaped member 522 is formed in a ring shape having a larger diameter than the first ring-shaped member 521 and can be coupled to the outer side of the first ring-shaped member 521. The second ring-shaped member 522 can also be secured to the guide member 523 so that the second ring-shaped member 522 receives the guide member 523 within its internal space.

According to this embodiment of the present disclosure, the bottom member 526 may be formed in a shape corresponding to the second ring-shaped member 522. For example, the bottom member 526 may be formed substantially in a ring shape. According to an embodiment, the bottom member 526 may be combined with the assembly of the first ring-shaped member 521, the guide member 523, and the second ring-shaped member 522. For example, the bottom member 526 can prevent separation of the guide member 523 by being secured to the corresponding side of the second ring-shaped member 522. According to an embodiment, the bottom member 526 and the second ring-shaped member 522 may be secured to each other by appropriate members. For example, the bottom member 526 may be secured to a locking step formed on the bottom of the second ring-shaped member 522 and secured by a securing pin 527. The securing pin 527 may be attached to at least a portion of the bottom member 526 by a securing tape 5271. Though not shown, the bottom member 526 may include a lubricating member. The lubricating member can prevent the bottom member 526 of the detachable input device 520 from coming in direct contact with the first side 511 of the front housing 510 when the detachable input device 520 combined with the front housing 510 (for example, in the combined configuration). The lubricating member may be made of an appropriate material. For example, the lubricating member may be provided as a tape of a predetermined thickness that is made of Teflon, which has high wear resistance. As another example, the lubricating member may be made using POM, nylon-based injection molding, and synthetic resin.

According to this embodiment, the detachable input device 520 may include the magnetic elements 525 arranged circumferentially at regular intervals. The magnetic elements 525 may be secured to the second ring-shaped member 522 or the assembly of the second ring-shaped member 522 and the guide member 523. When the second ring-shaped member 522 is circumferentially rotated with respect to the first ring-shaped member 521, the detachable input device 520 can be circumferentially rotated together with the second ring-shaped member 522 with respect to the first ring-shaped member 521 or the front housing 510. According to an embodiment, a sensor module 532 for detecting the magnetic fields of the magnetic elements 525 when the second ring-shaped member 522 is rotated may be disposed at a position vertically overlapping the rotational locus of the magnetic elements 525. According to an embodiment, eight magnetic elements 525 are arranged at regular intervals in the circumferential direction of the detachable input device 520, but the present disclosure is not limited thereto.

According to this embodiment, the rear housing 530 is combined with the front housing 510 to form the exterior of the electronic device 500, and the space between the rear housing 530 and the front housing 510 can house various components of the electronic device 500. For example, the electronic device 500 may include a substrate 531 (for example, a Printed Circuit Board (PCB) or a Flexible Printed Circuit Board (FPCB) in the space. The sensor module 532 (for example, a detector) detecting the magnetic elements 525 disposed on the detachable input device 520 may be disposed on the substrate. For example, the sensor module 532 may include a hall IC sensor.

Figure 6A:
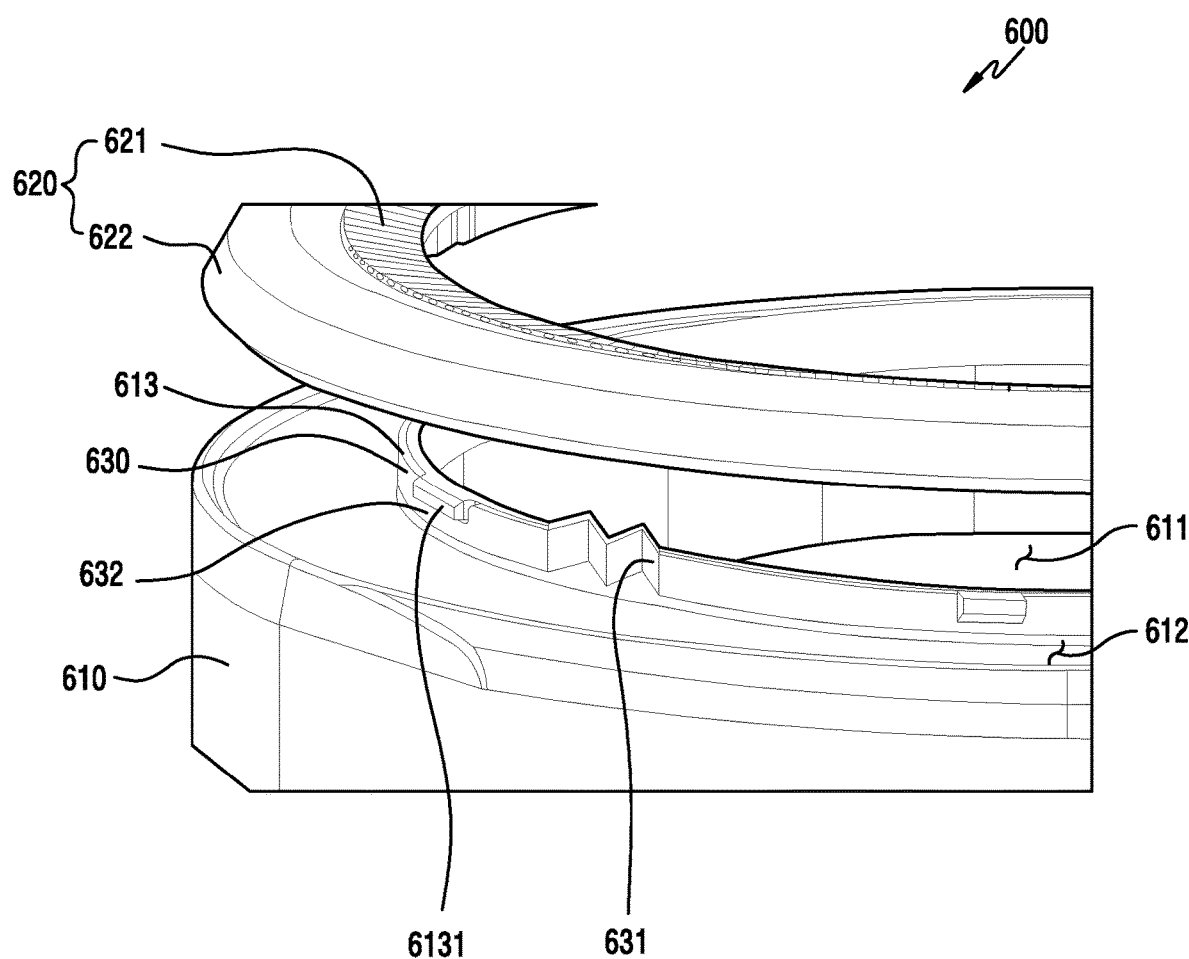
FIG. 6A is an exemplary perspective view showing a coupling structure of a housing according to an embodiment.
Figure 6B:
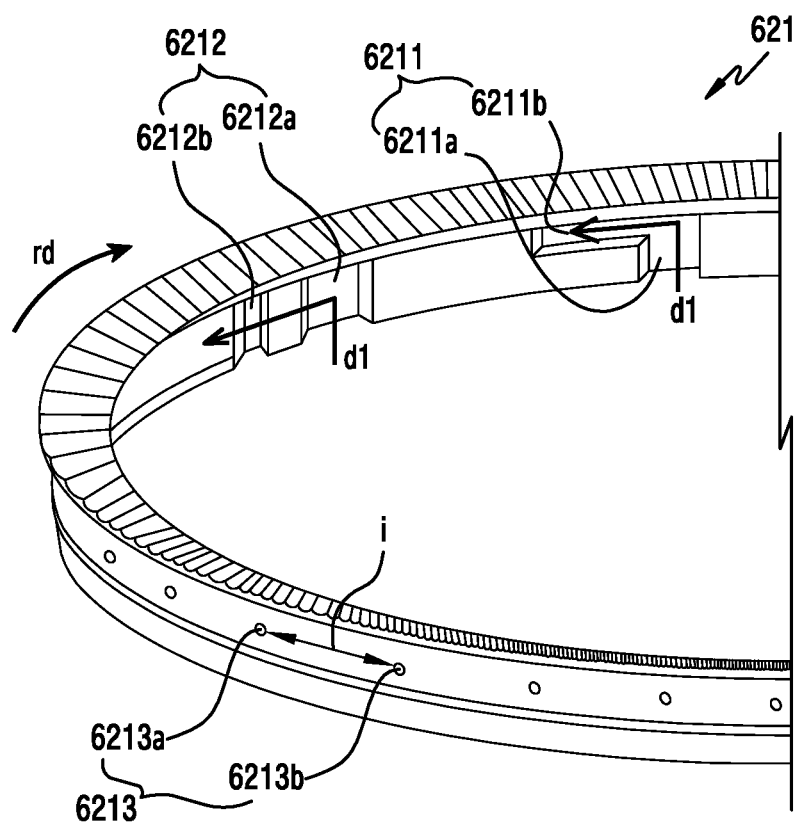
FIG. 6B is an exemplary perspective view showing a coupling structure of a first ring-shaped member of a detachable input device according to an embodiment.
Figure 6C:
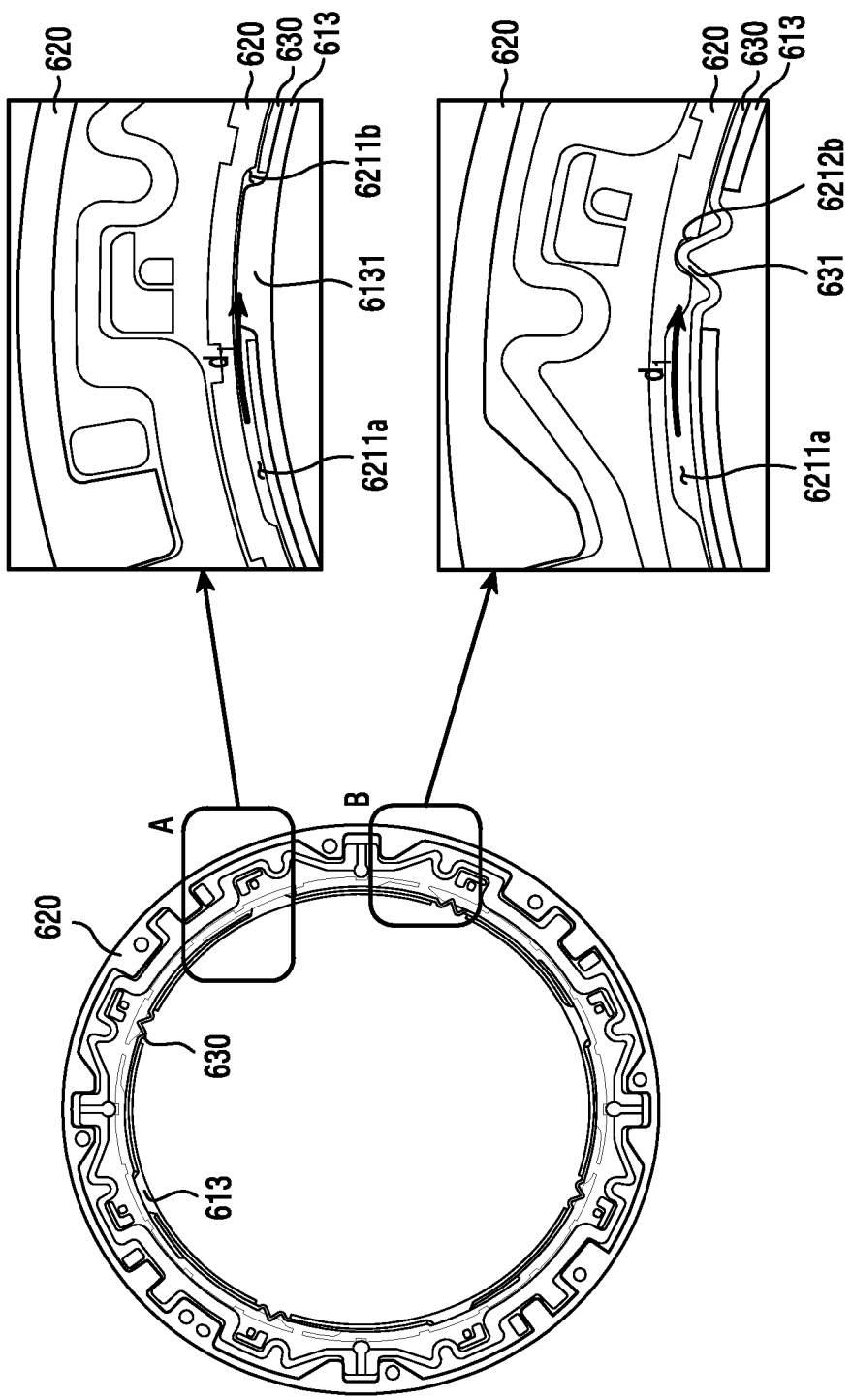
FIG. 6C is a horizontal cross-sectional view showing a combined configuration of the housing and the first ring-shaped member according to an embodiment.

FIG. 6A is an exemplary perspective view showing a coupling structure (or a rotary structure) of a housing according to an embodiment. FIG. 6B is an exemplary perspective view showing a coupling structure of a first ring-shaped member of a detachable input device according to an embodiment. FIG. 6C is a horizontal cross-sectional view showing a combined configuration of the housing and the first ring-shaped member according to an embodiment. The mechanism of coupling and separating a detachable input device 620 to and from a front housing 610 is described with reference to FIGS. 6A to 6C.

FIG. 6A is an exemplary perspective view showing a coupling structure of a housing according to an embodiment. A front housing 610 according to an embodiment may have an opening 611 formed through the first side 612. The opening 611 may be formed in a circular shape. The front housing 610 may have a protrusion 613 extending upward from the edge (i.e. circumference) of the opening 611. The protrusion 613 may have a plurality of first hooks 6131 protruding radially (i.e. extending from the center of the opening 611). The first hooks 6131 may be arranged circumferentially at regular intervals on the protrusion 613. A securing ring 630 may be coupled to surround the outer side of the protrusion 613. The securing ring 630 may have a plurality of second hooks 631 composed of ridges and grooves and circumferentially arranged. The second hooks 631 may be arranged circumferentially at regular intervals on the securing ring 630. That is, by coupling the protrusion 613 of the front housing 610 and the securing ring 630 to each other, a coupling structure composed of the first hooks 6131 and the second hooks 631 can be provided. As another example, the coupling structure composed of the first hooks 6131 and the second hooks 631 may be integrally formed with the front housing 610.

FIG. 6B is an exemplary perspective view showing a coupling structure of a first ring-shaped member of a detachable input device according to an embodiment. Referring to FIG. 6B, a first ring-shaped member 621 according to an embodiment may have a plurality of first hook grooves 6211 and a plurality of second hook grooves 6212 formed around the inner side thereof. The first hook grooves 6211 and the second hook grooves 6212 may be arranged circumferentially at regular intervals on the first ring-shaped member 621.

According to this embodiment, the first hook grooves 6211 and the second hook grooves 6212 may be alternately arranged circumferentially at regular intervals on the first ring-shaped member 621. Pairs of a first hook groove 6211 and a second hook groove 6212 may be disposed at four positions at regular intervals in the circumferential direction of the first ring-shaped member 621. The first hook grooves 6211 may be disposed at positions corresponding to the first hook 6131 of the front housing 610 and the second hook grooves 6212 may be disposed at positions corresponding to the second hook 631 of the front housing 610.

According to this embodiment, the first ring-shaped member 621 may have a plurality of stopper grooves 6213 arranged circumferentially at regular intervals on the outer side of first ring-shaped member 621. As the second ring-shaped member (not shown) rotates about a central axis of the first ring-shaped member 621 with respect to the first ring-shaped member 621, the ball units (not shown) secured to the second ring-shaped member are repeatedly inserted into and separated out of the stopper grooves 6213, thereby providing the user with tactile feedback (e.g. a clicking feeling) as the second ring-shaped member rotates. Frequency of the tactile feedback may be defined by the intervals of the stopper grooves. For example, when the interval 'i' between a first stopper groove 6213a and a second stopper groove 6213b is long, the user may have to rotate the second ring-shaped member by a significant amount before tactile feedback is provided. But when the interval 'i' between a first stopper groove 6213a and a second stopper groove 6213b is short, the user can feel a clicking feeling even if rotating the second ring-shaped member a little. The structures for providing tactile feedback using the stopper grooves 6213 and ball units will be described in detail with reference to FIGS. 8 and 9.

A mechanism composed of the first hook structures (the first hooks 6131 and the first hook groove 6211) and the second hook structure (the second hook grooves 6212 and the second hooks 631) to combine or separate the front housing 610 and the first ring-shaped member 621 (or the detachable input device 620) is described with reference to FIGS. 6A to 6C.

According to an embodiment, the first hook groove 6211 of the first ring-shaped member 621 each may have a vertical groove 6211a and a horizontal groove 6211b. Referring to a partially enlarged view A in FIG. 6C, the first ring-shaped member 621 (or the detachable input device) can be coupled to or separated from the front housing 610 by rotating it in the direction d1 indicated by the arrow. For example, when the first ring-shaped member 621 is vertically coupled to the front housing 610, the first hooks 6131 of the front housing 610 can be inserted into the vertical grooves 6211a of the first hook grooves 6211. When the first ring-shaped member 621 is rotated clockwise 'rd' with the first hooks 6131 inserted in the first hook grooves 6211, the first hooks 6131 can be inserted into the horizontal grooves 6211b of the first hook grooves 6211. Therefore, using the first hook structure (the first hooks 6131 and the first hook grooves 6211), the first hooks 6131 are locked in the horizontal grooves 6211b of the first hook grooves 6211, thereby restricting vertical movement.

According to an embodiment, the second hook groove 6212 of the first ring-shaped member 621 each may have an insertion groove 6212a and a securing groove 6212b. Referring to a partial enlarged view B in FIG. 6C, when the first ring-shaped member 621 (or the detachable input device 620) is coupled to the front housing 610 and rotated in a predetermined direction, the second hook grooves 6212 can be rotated with respect to the outer side of the securing ring 630 of the front housing 610. When the first ring-shaped member 621 is coupled to the front housing 610 and rotated at a predetermined angle in a predetermined direction, the second hook grooves 6212 can be locked and secured to the second hooks 631 of the front housing 610. For example, when the first ring-shaped member 621 is vertically coupled to the front housing 610, the second hooks 631 of the front housing 610 can be seated into the insertion grooves 6212a of the second hook grooves 6212. When the first ring-shaped member 621 is rotated clockwise 'rd' with the second hooks 631 seated in the insertion grooves 6212a, the second hooks 631 can be confined in the securing grooves 6212b of the second hook grooves 6212. Using the second hook structure (the second hooks 631 and the second hook grooves 6212), the second hooks 631 of are locked in the securing grooves 6212b of the second hook grooves 6212, thereby restricting movement in the rotational direction. In other words, the detachable input device 620 can be secured without separating in the rotational direction from the front housing 610 by the second hook structure.

Accordingly, the coupling structure composed of the first hooks 6131 and the first hook grooves 6211 can prevent the first ring-shaped member 621 from vertically separating from the front housing 610. The second hooks 631 and the second hook grooves 6212 can prevent the first ring-shaped member 621 from separating in the rotational direction from the front housing 610. That is, the first ring-shaped member 621 (or the detachable input device) according to various embodiments can be coupled to or separated from the front housing 610 by assembling the first hook structure and the second hook structure in the direction d1 indicated by the arrow. In other words, the detachable input device 620 can be easily removed for replacement from the electronic device 600 using the first hook structure and the second hook structure. Since the detachable input device that can be easily attached to and detached from the front housing, it is possible to improve manufacturing process of the electronic device and easily repair the electronic device when malfunctions occur.

In the electronic device 600 according to the embodiment shown in FIGS. 6A and 6B, the front housing 610 has the first hooks 6131 and the second hooks 631 and the first ring-shaped member 621 has the first hook grooves 6211 and the second hook grooves 6212, but the present disclosure it not limited thereto. The first hook structure and the second hook structure may be implemented on the front housing 610 and/or the first ring-shaped member 621. For example, in one embodiment, the front housing 610 may have first hooks and second hooks and the first ring-shaped member 621 may have first hook grooves and second hook grooves. But in another embodiment, the first ring-shaped member 621 may have first hooks and second hooks and the front housing 610 may have first hook grooves and second hook grooves. In yet another embodiment, the front housing 610 and the first ring-shaped member 621 may be coupled together using an appropriate adhesive material.

Figure 7A:
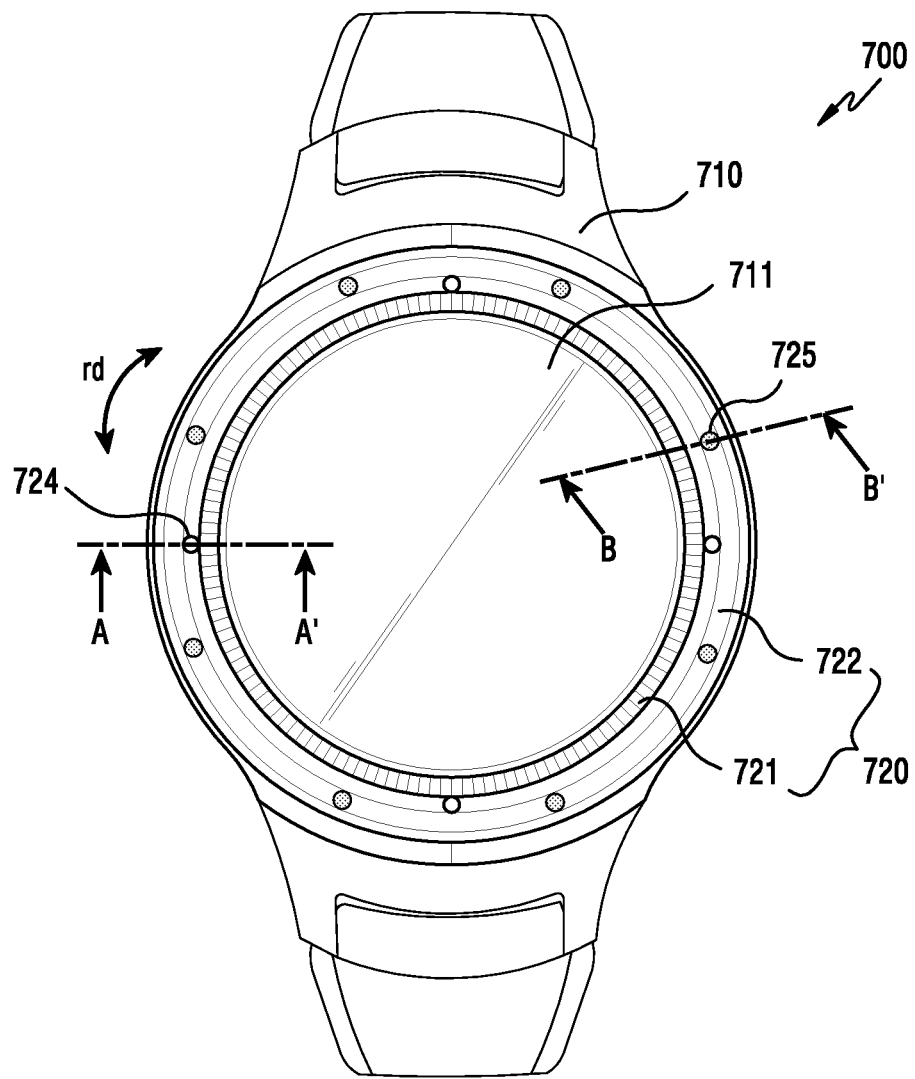
FIG. 7A is an exemplary plan view showing the arrangement relationship between magnetic elements and balls in an electronic device according to an embodiment.

FIG. 7A is an exemplary plan view showing the arrangement relationship between magnetic elements and balls in an electronic device according to an embodiment. Referring to FIG. 7A, a front housing 710 of an electronic device 700 according to an embodiment may include a detachable input device 720 disposed to surround the edge of a display 711. The detachable input device 720 may include a first ring-shaped member 721, a second ring-shaped member 722, ball units 724, and magnetic elements 725.

According to an embodiment, the second ring-shaped member 722 may surround the edge of the first ring-shaped member 721 and coupled to be rotatable with respect to the first ring-shaped member 721. The first ring-shaped member 721 may be detachably secured to a portion of the edge of the display 711. Accordingly, the second ring-shaped member 722 can be rotated about the front housing 710 and may be referred to as a rotary member.

According to an embodiment, the detachable input device 720 may include a plurality of ball units 724 for providing tactile feedback when the second ring-shaped member 722 is rotated by the user. The ball units 724 may be arranged at regular intervals in the circumferential direction of the second ring-shaped member 722. For example, four balls 7241 may be arranged with regular angular intervals (90 degrees). Further, the balls 7241 may be positioned on a first circumferential locus. According to an embodiment, the balls 7241 may be secured to the second ring-shaped member 722 to press the outer side of the first ring-shaped member 721 by elastic members in the second ring-shaped member 722. The balls 7241 and the elastic members will be described in detail with reference to FIGS. 8 to 10.

According to an embodiment, the detachable input device 720 may include a plurality of magnetic elements 725 for detecting rotational movement of the second ring-shaped member 722. For example, the magnetic elements 725 may be positioned on a second circumferential locus. Alternatively, the magnetic elements 725 may be arranged along a rotational path of the detachable input device 720. According to an embodiment, the electronic device 700 may include at least one sensor module (532 in FIG. 5) disposed at a position corresponding to the rotational locus of the magnetic elements 725 that are moved when the second ring-shaped member 722 is rotated, so as to detect the rotational movement of the second ring-shaped member 722. The magnetic elements 725 may be arranged at regular intervals in the circumferential direction of the second ring-shaped member 722. For example, eight magnetic elements 725 may be arranged at regular angular intervals (45 degrees).

According to an embodiments, when the second ring-shaped member 722 is rotated with respect to the front housing 710, particles may be produced by friction between the balls 7241 and the first ring-shaped member 7210. The produced particles can be collected by the magnetic elements 725 along a second locus of the magnetic elements 725. When the produced particles are collected to the magnetic elements 725, the contact rotation between the ball units 724 and the first ring-shaped member 721 may be interrupted. To avoid this, the first locus on which the balls 7241 are positioned and the second locus on which the magnetic elements 725 are positioned may not be the same, and the larger the gap between the first locus and the second locus is, the more advantageous. In other words, the first locus and the second locus may have different radii from the center of the detachable input device 720. For example, the second locus on which the magnetic elements 725 are positioned may have a larger radius than the first locus on which the ball units 724 are positioned.

Figure 7B:
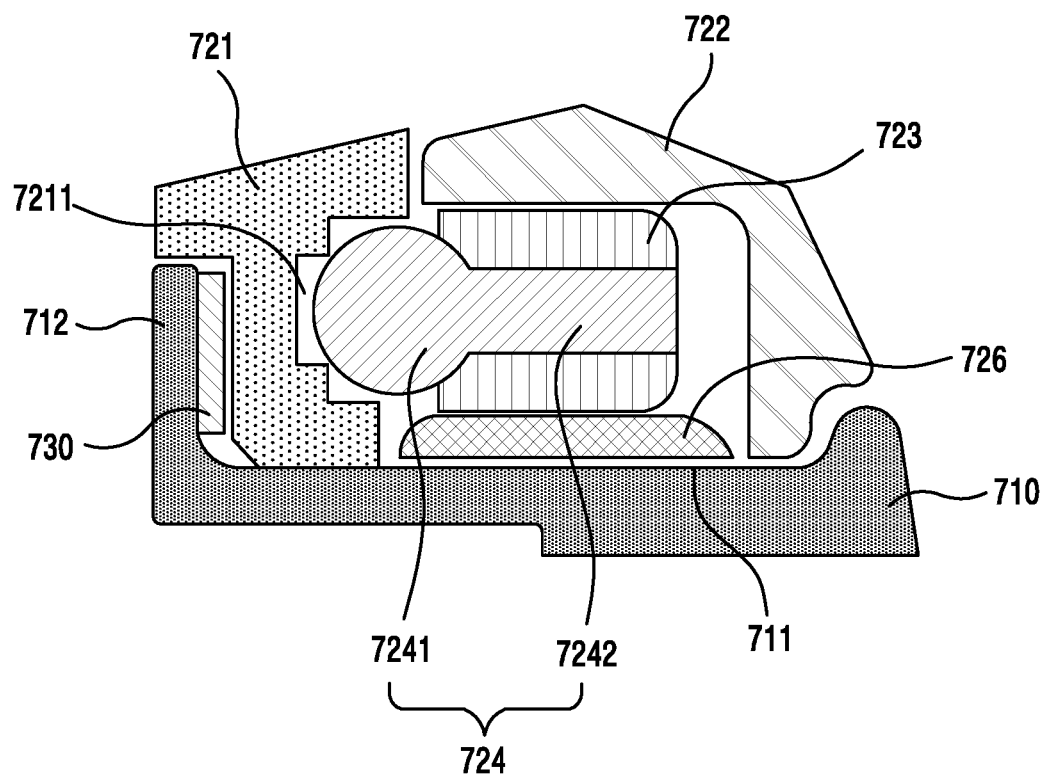
FIG. 7B is a cross-sectional view taken along line A-A' shown in FIG. 7A according to an embodiment.

FIG. 7B is a cross-sectional view taken along line A-A' in FIG. 7A and showing a portion including a ball unit 724 in the detachable input device 720. According to an embodiment, the detachable input device 720 may be an assembly of a first ring-shaped member 721, a second ring-shaped member 722, a guide member 723, ball units 724, magnetic elements (725 in FIG. 7B), and a bottom member 726.

According to this embodiment, the detachable input device 720 may be detachably coupled to the front housing 710. For example, the detachable input device 720 can be detachably coupled by a coupling structure formed between an assembly, which is composed of a protrusion 712 extending upward from the front housing 710 and a securing ring 730, and the inner side of the first ring-shaped member 721. The coupling structure was described with reference to FIGS. 6A and 6B.

According to this embodiment, the guide member 723 may be coupled to be rotatable on the outer side of the first ring-shaped member 721. The guide member 723 may include the ball units 724 arranged at regular intervals in the circumferential direction of the detachable input device 720. The ball units 724 each may have a ball 7241 and a coupling rod 7242. The ball units 724 may have receiving grooves formed at regular intervals on at least a portion of the guide member 723. The ball units 724 may be coupled to the guide member 723 by inserting the coupling rod 7242 in the receiving grooves. That is, the balls units 724 can be supported by the guide member 723. The ball 7241 and the coupling rod 7242 of the ball unit 724 may be separately formed and then coupled to each other or may be integrally formed. For example, the balls 7241 may be attached to the coupling rods 7242 by an appropriate adhesive material or the balls 7241 and the coupling rods 7242 may be integrally formed by double injection molding.

According to this embodiment, the balls 7241 may be disposed in contact with the outer side of the first ring-shaped member 721. The balls 7241 being in contact with the outer side of the first ring-shaped member 721 may facilitate rotation when the guide member 723 (or the second ring-shaped member 722 secured to the guide member) is rotated with respect to the first ring-shaped member 721.

According to this embodiment, the second ring-shaped member 722 and the bottom member 726 can be coupled to the assembly of the first ring-shaped member 721 and the guide member 723. For example, the second ring-shaped member 722 may be coupled downward to the guide member 723 to receive the guide member 723 outside the first ring-shaped member 721. The bottom member 726 may be coupled upward to the guide member 723 coupled to the second ring-shaped member 722. According to an embodiment, a decorative member (not shown) may be coupled to or integrally formed with the top of the second ring-shaped member 722. The decorative member can improve the aesthetic appearance of the second ring-shaped member 722. In another embodiment, a lubricating member (not shown) maybe disposed between the bottom member 726 and the edge of the display 711 of the front housing 710. For example, the lubricating member may be disposed on the bottom of the bottom member 726. Alternatively, the lubricating member may be disposed around the edge of the display 711 of the front housing 710. The lubricating member can prevent the bottom member 726 of the detachable input device 720 from coming in direct contact with the display 711 of the front housing 710 when the detachable input device 720 is combined with the front housing 710 (for example, in the combined state).

Figure 7C:
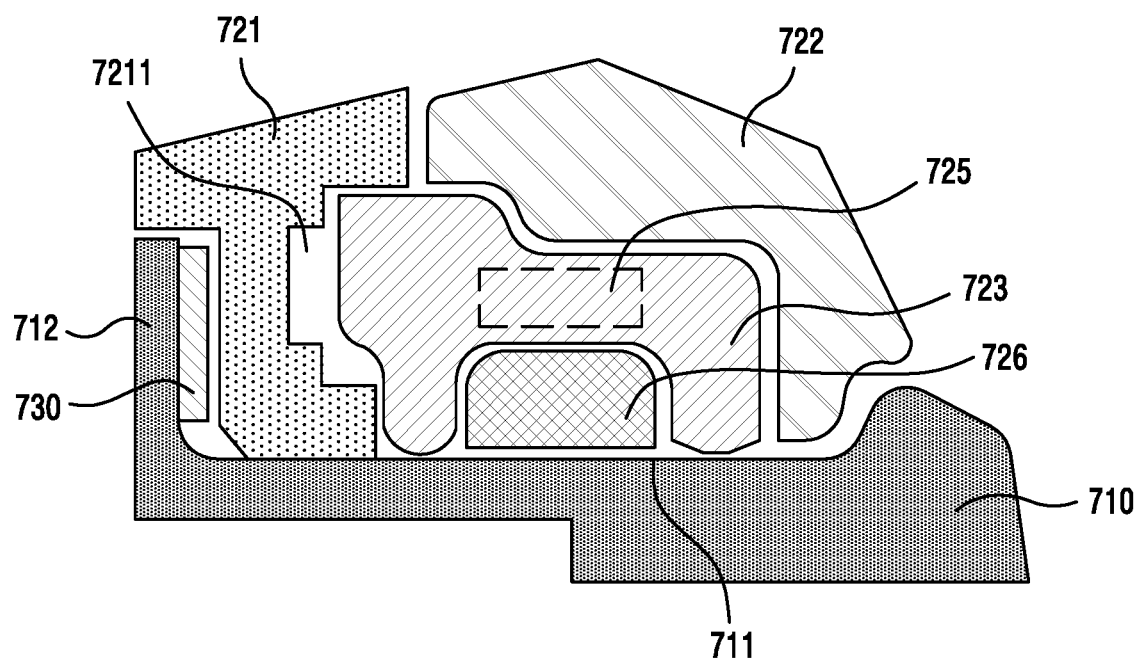
FIG. 7C is a cross-sectional view taken along line B-B' shown in FIG. 7A according to an embodiment.

FIG. 7C is a cross-sectional view taken along line B-B' shown in FIG. 7A according to an embodiment. Configurations that are the same as or similar to the configuration described with reference to FIGS. 7A and 7B are not described in detail. Referring to FIG. 7C, the cross-sectional view taken along line B-B' shown in FIG. 7A shows a portion including a magnetic element 725 in the detachable input device 720.

According to an embodiment, the detachable input device 720 may include the magnetic elements 725 arranged circumferentially at regular intervals. For example, the magnetic elements 725 may be secured to the second ring-shaped member 722 or the assembly of the second ring-shaped member 722 and the guide member 723. In another embodiment, the magnetic elements 725 may be inserted in grooves formed on the bottom member 726.

According to this embodiment, when the second ring-shaped member 722 is circumferentially rotated with respect to the first ring-shaped member 721, the detachable input device 720 can be circumferentially rotated together with the second ring-shaped member 722 with respect to the first ring-shaped member 721 or the front housing 710. According to an embodiment, the electronic device 700 may include a sensor module (532 in FIG. 5) at a position vertically overlapping a rotational locus of the magnetic elements 725 when the second ring-shaped member 722 is rotated. The sensor module can detect the magnetism of the magnetic elements 725. According to an embodiment, eight magnetic elements 725 are arranged at regular intervals in the circumferential direction of the detachable input device 720, but the present disclosure is not limited thereto.

According to this embodiment, the guide member 723 may have a protrusion protruding toward the first ring-shaped member 721 (or the center of the detachable input device 720). The protrusion of the guide member 723 may be received inside the outer side of the first ring-shaped member 721. The protrusion can function as a guide together with the balls (7241 in FIG. 7B) when the guide member 723 (or the second ring-shaped member 722 secured to the guide member) is rotated with respect to the first ring-shaped member 721.

Figure 8:
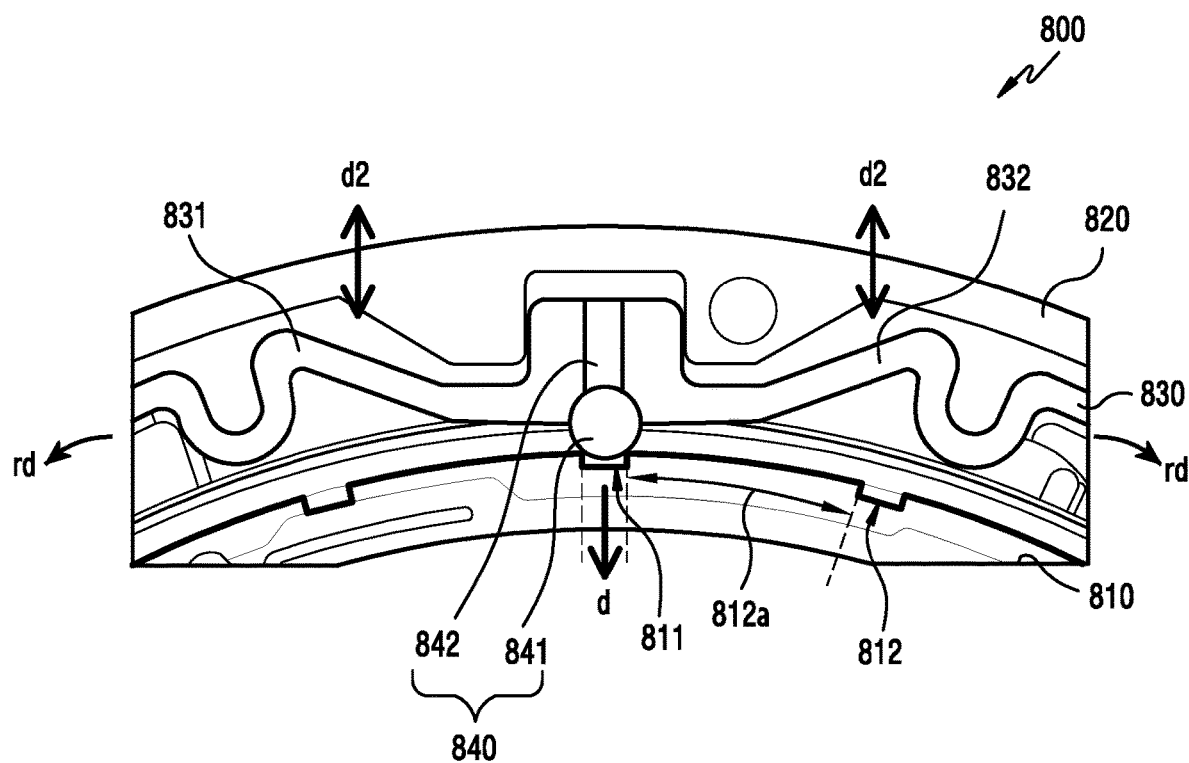
FIG. 8 is an exemplary cross-sectional view of an elastic structure and a guide member included in a detachable input device according to an embodiment.

FIG. 8 is an exemplary cross-sectional view of an elastic structure and a guide member included in a detachable input device according to an embodiment. Referring to FIG. 8, a detachable input device 800 may include a first ring-shaped member 810, a second ring-shaped member 820, and a guide member 830 disposed between the first ring-shaped member 810 and the second ring-shaped member 820. The guide member 830 may be coupled to be rotatable on the outer side 812 of the first ring-shaped member 810. The guide member 830 may be secured to the second ring-shaped member 820 or may be received in the internal space of the second ring-shaped member 820 and be confined by the second ring-shaped member 820. Accordingly, the second ring-shaped member 820 and the guide member 830 can be rotated in a circumferential direction 'rd' with respect to the first ring-shaped member 810.

According to an embodiment, the guide member 830 may include ball units 840 arranged at regular intervals in the circumferential direction 'rd' of the detachable input device 800. The ball units 840 each may have a ball 841 and a coupling rod 842. The ball units 840 may have receiving grooves formed at regular intervals in the circumferential direction 'rd' on at least a portion of the guide member 830. The ball units 840 may be coupled to the guide member 830 by inserting the coupling rods 842 in the receiving grooves. According to an embodiment, the balls 841 and the coupling rods 824 of the ball units 840 may be separately formed and then coupled to each other or may be integrally formed. For example, the balls 841 may be attached to the coupling rods 842 by an appropriate adhesive material or the balls 841 and the coupling rods 842 may be integrally formed by double injection molding.

According to an embodiment, the balls 841 may be disposed in contact with the outer side 812 of the first ring-shaped member 810. The guide member 830 (or the second ring-shaped member 820) can be rotated in the circumferential direction 'rd' (for example, clockwise or counterclockwise) with respect to the first ring-shaped member 810 because the balls 841 of the first ring-shaped member 810 slide on the outer side 812. A plurality of stopper grooves 811 may be arranged at regular intervals in the circumferential direction 'rd' of the outer side 812 of the first ring-shaped member 810. Accordingly, when the second ring-shaped member 820 is rotated in the circumferential direction 'rd' by input from a user, the guide member 830 secured to the second ring-shaped member 820 can also be rotated in the circumferential direction 'rd' with respect to the first ring-shaped member 810. As the guide member 830 is rotated, the balls 841 in contact with the outer side 812 of the first ring-shaped member 810 can slide across the stopper grooves 811 and flat areas 812a. The balls 841 may be larger in diameter than the stopper grooves 811. Accordingly, when the guide member 830 rotates and the balls 841 slide on the flat areas 812a, the balls 841 are not fully locked into the stopper grooves 811.

According to this embodiment, the detachable input device 800 may have an elastic structure that presses the ball units 840, that is, the balls 841 in the radial direction 'd' toward the center of the detachable input device 800. For example, the guide member 830 may have a structure that presses the balls 841. The guide member 830 may have first ribs 831 and second ribs 832 on both sides of the ball unit 840. When the ball 841 is moved from a position where the ball 841 is inserted in the stopper groove 811 to the flat area 812a (i.e. separated from the stopper groove 811), the first rib 831 and the second rib 832 can be moved in the vertical direction 'd2' relative to the second ring-shaped member 820. When the ball 841 is positioned on the flat area 812a (or separated from the stopper groove 811), the first rib 831 and the second rib 832 has elasticity (or stress) in the longitudinal direction, so they can press the ball 841 in the radial direction 'd'. That is, while second ring-shaped member 820 is rotated with respect to the first ring-shaped member 810, the guide member 830 can provide elasticity to the balls 841 with deformation of the first ribs 831 and the second ribs 832. Accordingly, the guide member 830 may be referred to as a flexible member.

According to this embodiment, when the second ring-shaped member 820 is rotated and the balls 841 are moved to the stopper grooves 811, the first ribs 831 and the second ribs 832 can press the balls 841 such that the balls 841 are inserted into the stopper grooves 811. As the balls 841 are repeatedly inserted into and separated out of the stopper grooves 811, the detachable input device 800 can provide tactile feedback (for example, a locking feeling or a stopping feeling during rotation) to the user. The tactile feedback may be referred to as a clicking feeling or a detent feeling. The tactile feedback may be determined by the materials of the balls 841 and the outer side 812 of the first ring-shaped member 810 that the balls 841 are in contact with. For example, the balls 841 and the first ring-shaped member 810 may be made of one of metal, plastic, stainless steel, rubber, and ceramic or a combination of these materials. The tactile feedback may also depend on the material and/or the shape of the guide member 830 that provides elasticity for pressing the balls 841. The tactile feedback may also depend on the speed of the balls 841 moving into and separating out of the stopper groove 811 and the speed may be determined by the elasticity that the guide member 830 provides. The elasticity (modulus of elasticity) that the guide member 830 provides may depend on the shape or the material of the first ribs 831 and the second ribs 832. Accordingly, the tactile feedback may depend on the material and/or the shape of the first ribs 831 and the second ribs 832 of the guide member 830.

Figure 9:
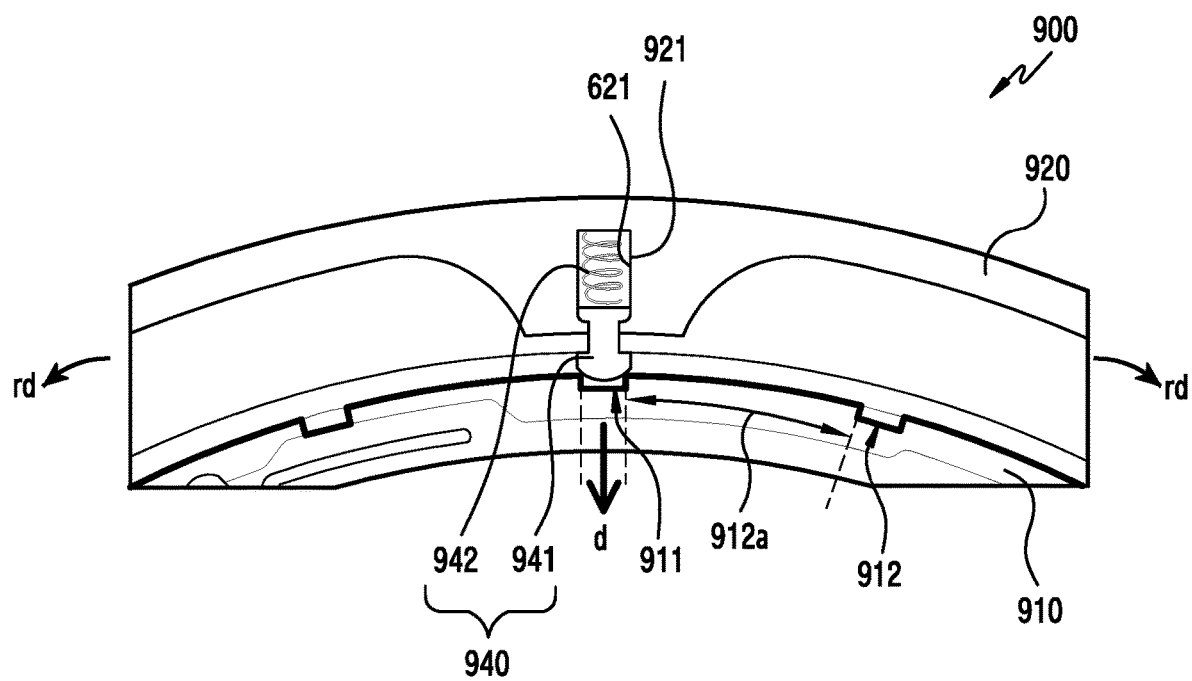
FIG. 9 is an exemplary cross-sectional view of an alternative elastic structure and included in a detachable input device according to an embodiment.

FIG. 9 is an exemplary cross-sectional view of an alternative elastic structure included in a detachable input device according to an embodiment. Configurations that are the same as or similar to the configuration described with reference to FIG. 8 are not described in detail.

According to an embodiment, ball units 940 each may be composed of a ball 941 and an elastic member 942. For example, the elastic member 942 may include a spring member. The elastic members 942 are received in receiving grooves 921 formed on a second ring-shaped member 920 and can press the balls 941 to the outer side 912 of the first ring-shaped member 910. When the balls 941 are positioned on flat areas 912a (i.e. separated out of stopper grooves 911), the elastic members 942 can press the balls 941 in the radial direction 'd'. When the second ring-shaped member 920 is rotated and the balls 941 are moved to the stopper groove 911, the elastic members 942 can press the balls 941 such that the balls 941 are inserted into the stopper grooves 911. As the balls 941 are repeatedly inserted into and separated out of the stopper grooves 911, the detachable input device 900 can provide tactile feedback to the user.

Figure 10:
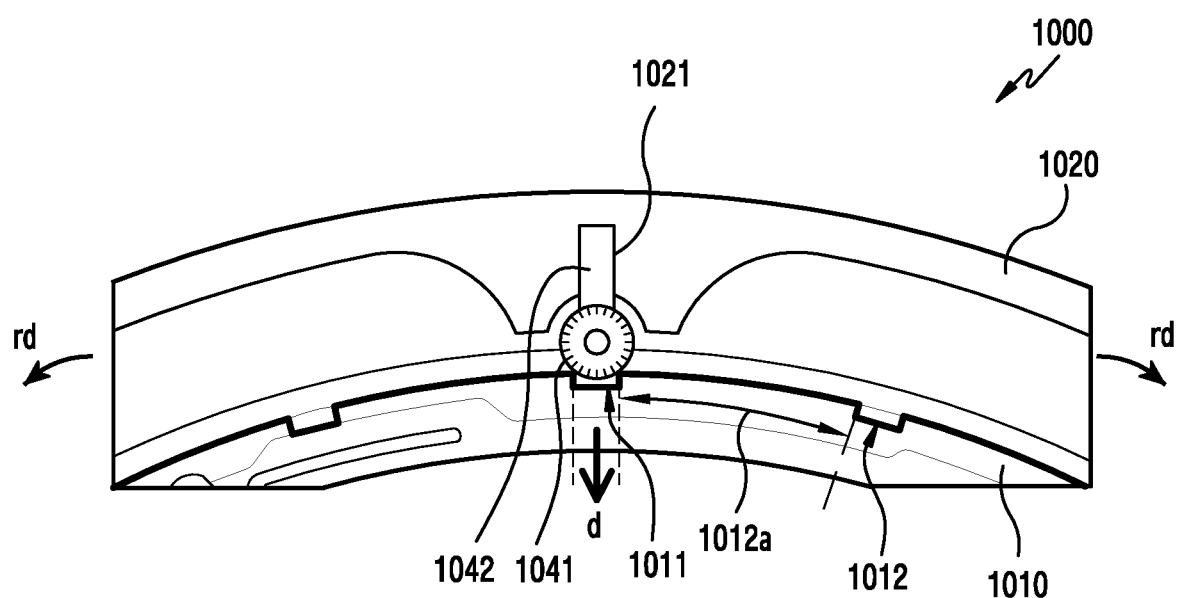
FIG. 10 is an exemplary cross-sectional view of an alternative elastic structure included in a detachable input device according to an embodiment.

FIG. 10 is an exemplary cross-sectional view of an alternative elastic structure included in a detachable input device according to an embodiment. Configurations that are the same as or similar to the configuration described with reference to FIGS. 8 and 9 are not described in detail.

According to an embodiment, a second ring-shaped member 1020 may have receiving grooves 1021 therein and connecting portions 1042 connected with rotary members 1041 may be received and secured in the receiving grooves 1021. The rotary members 1041 are rotatably coupled to ends of the connecting portions 1042. Accordingly, the rotary members 1041 may be referred to as wheels. The outer sides of the rotary members 1041 may be in contact with the outer side 1012 of a first ring-shaped member 1010. When the second ring-shaped member 1020 is rotated in a circumferential direction 'rd', the rotary members 1041 can rotate and slide on the outer side 1012 of the first ring-shaped member 1010. Accordingly, when the second ring-shaped member 1020 is rotated in the circumferential direction 'rd', the rotary members 1041 rotate and slide on the outer side 1012 having a plurality of stopper grooves 1011 and flat areas 1012a alternately arranged at regular intervals, thereby providing tactile feedback to the user.

Figure 11B:
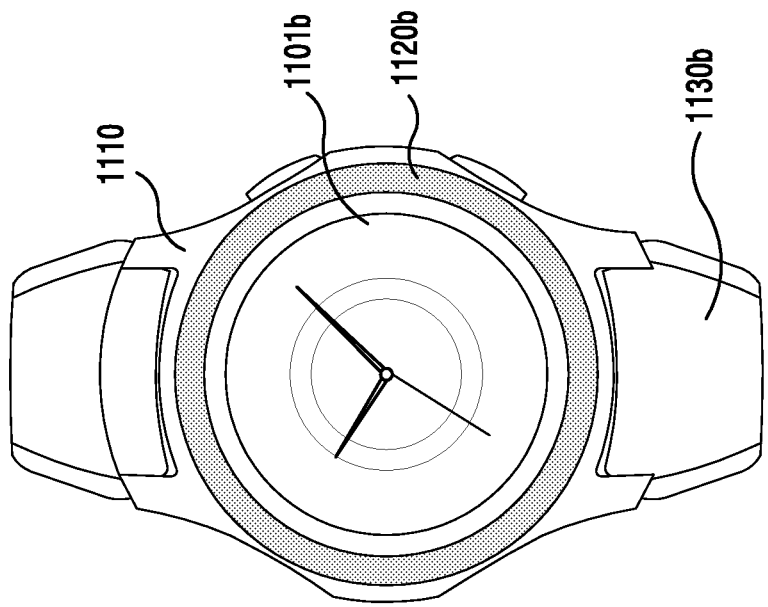
FIGS. 11A and 11B are an exemplary plan view of an electronic device including a detachable input device according to various embodiments.
Figure 11A:
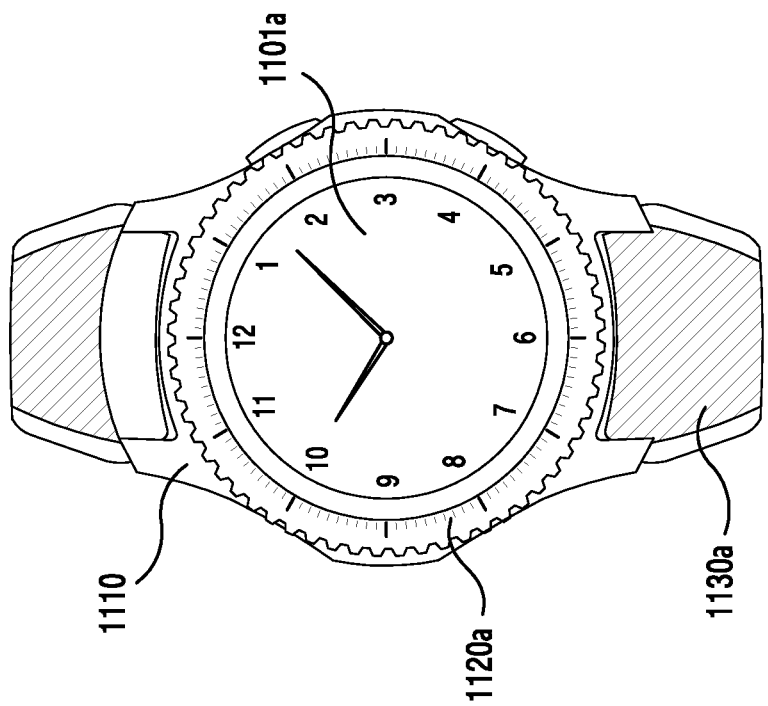

FIGS. 11A and 11B are an exemplary plan view of an electronic device including a detachable input device according to various embodiments. An electronic device 1100 according to various embodiments may include a front housing 1110, a display 1101a, 1101b disposed on the front housing 1110, a detachable input device 1120a, 1120b disposed to surround the display 1101a, 1101b, and straps 1130a, 1130b connected to both ends of the front housing 1110. In various embodiments, the detachable input device 1120a, 1120b may have various shapes, material, and patterns and can be easily coupled to and separated from the front housing 1110. Similarly, the straps 1130a, 1130b may also have various shapes, material, and patterns and can be easily coupled to and separated from the front housing 1110. Accordingly, a user can replace the detachable input device 1120a, 1120b and/or straps 1130a, 1130b with detachable input devices and/or straps that have desired shapes, materials, and patterns, depending of his/her preference.

Referring to FIG. 11A, in an embodiment, a detachable input device 1120a may have convex portions on the outer side and may further have a scale allowing the user to recognize predetermined angles. The outer side may be formed in a saw tooth shape to allow a user to easily rotate the detachable input device 1120a or to improve the aesthetic appearance. However, the present disclosure is not limited to this embodiment and a plurality of recesses may be formed around the outer side (for example, 340 in FIG. 3) or the outer side may be formed flat (for example, 522 in FIG. 5). In an embodiment, straps 1130a have a hatching pattern and may be made of leather or metal. A display 1101a may be a User Interface (UI) showing a clock having numerals. Referring to FIG. 11B, in another embodiment, the detachable input device 1120b may have a flat shape and a dark color. Straps 1130b may not have a pattern and may be made of at least one of rubber, silicon, and urethane. A display 1101b may be a simple UI showing a clock without numerals. That is, an electronic device according to the present disclosure can allow a user to select various external appearances by replacing a detachable input device that can be attached to and detached from a front housing.

Figure 12:
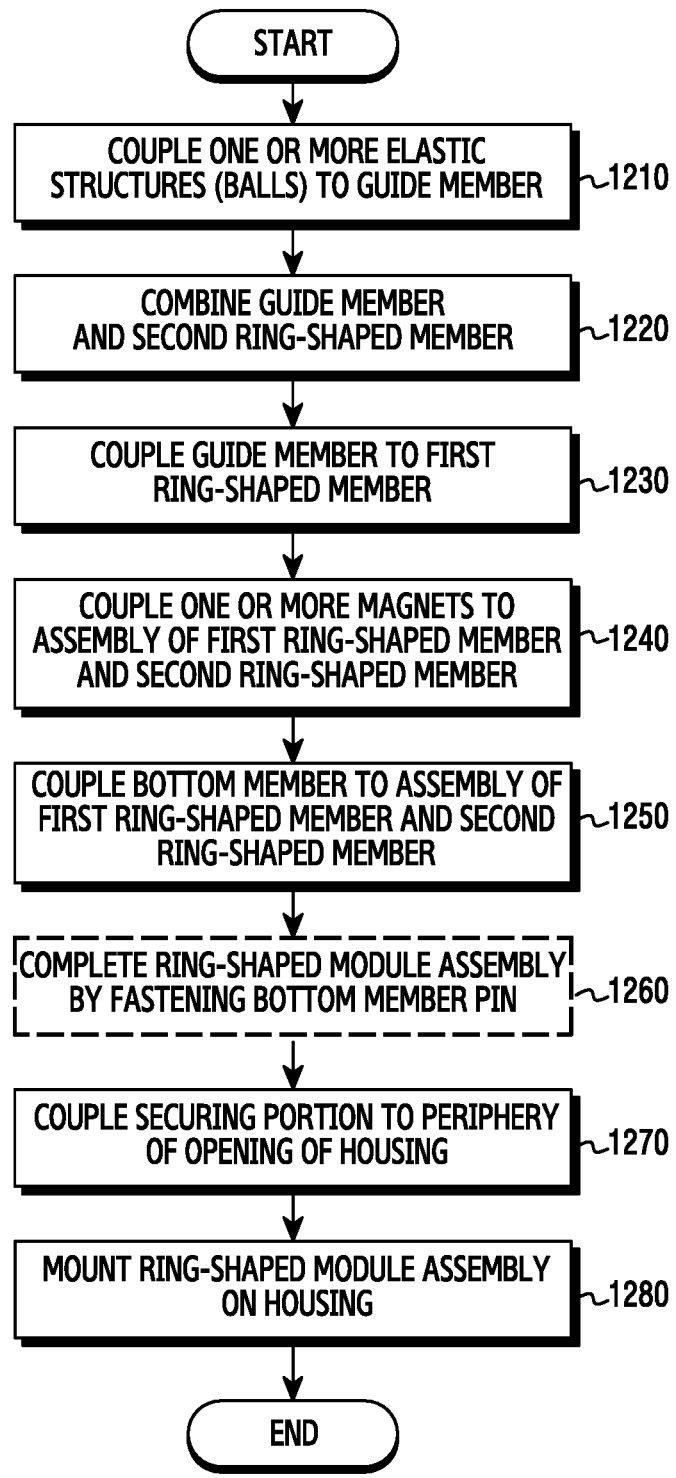
FIG. 12 is an exemplary flowchart showing a process of assembling an electronic device according to an embodiment.

FIG. 12 is an exemplary flowchart showing a process of assembling an electronic device according to an embodiment. The process shown in FIG. 12 is described below with reference to FIG. 5.

In process 1210, a guide member 523 may be prepared. According to an embodiment, the guide member 523 may be formed in a ring shape. One or more balls 524 (or ball units 724 shown in FIG. 7A) may be secured in the guide member 523. For example, four balls may be arranged at regular angular intervals (90 degrees).

In process 1220, the assembly formed in step 1210 and a second ring-shaped member 522 may be combined. The guide member 523 may be received in an internal space of the second ring-shaped member 522.

In process 1230, the assembly formed in step 1220 and a first ring-shaped member 521 may be combined. The guide member 523 may be coupled to the outer side 5211 of the first ring-shaped member 521 so that it can be circumferentially rotated outside the first ring-shaped member 521. The balls 524 may be disposed to be in contact with the outer side 5211 of the first ring-shaped member 521. When the guide member 523 is rotated, the balls 524 are repeatedly inserted into and separated out of one or more stopper grooves 5212 arranged circumferentially at regular intervals around the outer side 5211, so as to provide tactile feedback to the user.

In process 1240, the assembly formed in process 1230 and one or more magnetic elements 525 may be combined. For example, the magnetic elements 525 may be inserted in receiving grooves formed at the guide member 523 or the second ring-shaped member 522. The magnetic elements 525 may be arranged at regular angular intervals. For example, eight magnetic elements 525 may be arranged at regular angular intervals (45 degrees).

In process 1250, a bottom member 526 may be coupled to the assembly obtained in process 1240. The bottom member 526 may be combined with the second ring-shaped member 522 to retain the guide member 523 in the internal space of the second ring-shaped member 522.

In process 1260, the bottom member 526 can be secured to the second ring-shaped member 522 by coupling a securing pin 527 to the assembly obtained in process 1250. The securing pin 527 can prevent the bottom member 526 from vertically separating or circumferentially rotating. The securing pin 527 may use a securing tape 5271 as an adhesive member. However, the present disclosure is not limited thereto, the bottom member 526 and the second ring-shaped member 522 may be secured to each other in various ways and process 1260 may be omitted.

Through processes 1210 to 1260, the detachable input device 520 is assembled.

In process 1270, a housing 510 may be prepared. The housing 510 may have an opening 512 formed through the top (or a first side 511) and a protrusion 513 extending in a first direction 'd1' from the edge of the opening. A securing ring 540 may be coupled to the protrusion 513. A coupling structure may be provided between the housing 510 and the detachable input device 520.

In operation 1280, the detachable input device 520 completed through processes 1210 to 1260 may be coupled to the housing 510 prepared in process 1270. The coupling structure between the detachable input device 520 and the housing 510 can prevent separation in a first direction 'd1' and a circumferential direction 'rd'. For example, the detachable input device 520 may be mounted in a second direction 'd2' to surround the opening 512 of the housing 510 and then rotated clockwise, thereby being coupled to the housing 510. Alternative, after the detachable input device 520 is coupled, the detachable input device 520 can be separated from the housing 510 by rotating counterclockwise with over a predetermined force and then pulling it out in the first direction. According to various embodiments, after the processes described above, a process of coupling straps for wearing on the body of the user to at least a portion of the housing may be further performed.

Figure 13B:
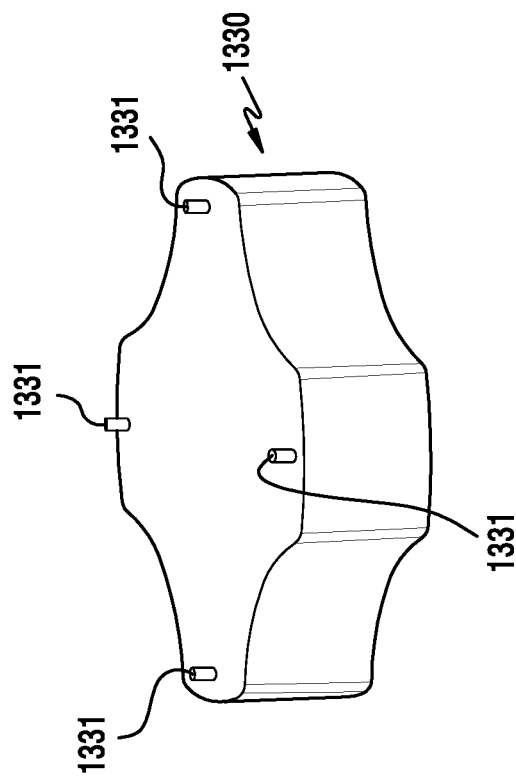
FIGS. 13A and 13B show a tool for helping the assembly of an electronic device according to an embodiment.
Figure 13A:
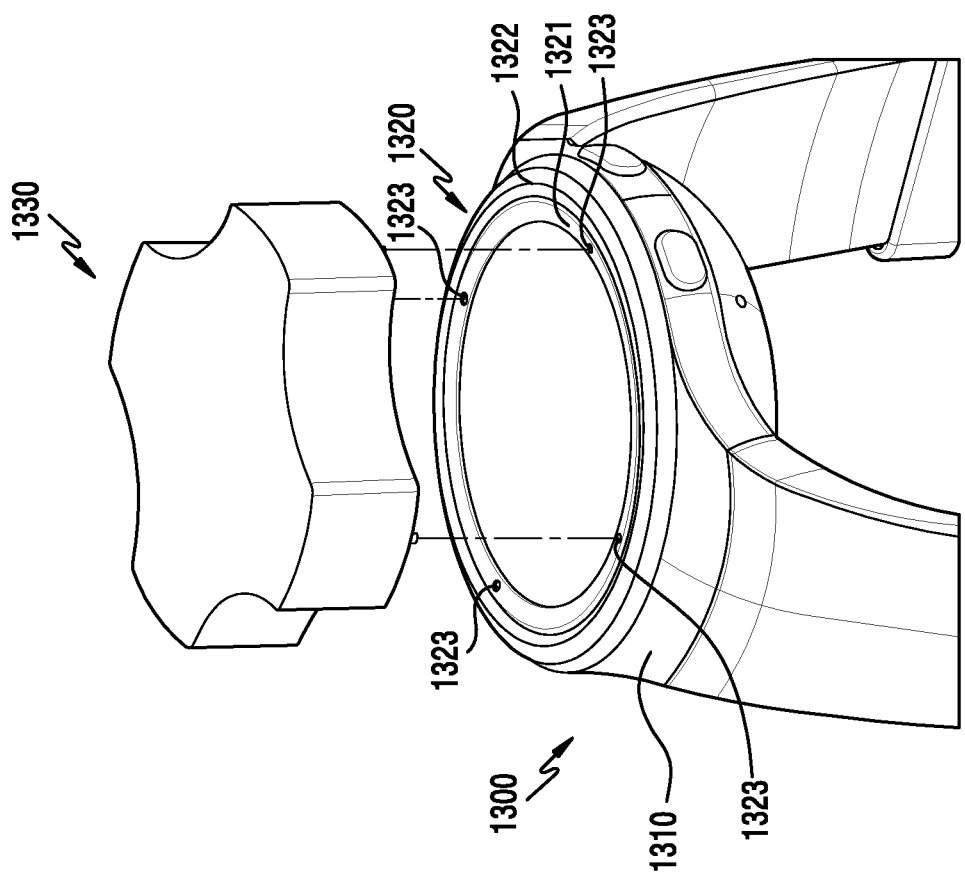

FIGS. 13A and 13B show an assembly tool for helping the assembly of an electronic device according to an embodiment.

Referring to FIG. 13A, coupling a housing 1310 and a detachable input device 1320 to each other in an electronic device 1300 (for example, process 1280 in FIG. 12) may be easily performed by using an assembly tool 1330, which may be referred to as a jig. According to an embodiment, the detachable input device 1320 may include a first ring-shaped member 1321 secured to the housing 1310 and a second ring-shaped member 1322 coupled to be rotatable with respect to the first ring-shaped member 1321. The first ring-shaped member 1321 may have one or more assembly grooves 1323. Referring to FIG. 13B, the assembly tool 1330 may have assembly protrusions 1331 formed to correspond to the assembly grooves 1323. A user can put the assembly tool 1330 on the detachable input device 1320 such that the assembly protrusions 1331 are inserted in the assembly grooves 1323 and then rotate the assembly tool 1330, which in turn causes the rotation of the first ring-shaped member 1321. Since the second ring-shaped member 1322 at the outermost side is rotatably coupled, the user may have difficulty in directly applying a physical force for coupling the first ring-shaped member 1321 to the housing 1310 by rotating it. The user can solve this problem by using the assembly tool 1330 that can directly transmit torque to the first ring-shaped member 1321.

According to various embodiments, the assembly tool 1330 is made of a material in a shape for allowing a user to easily apply torque. For example, the assembly tool 1330 may have a shape with a plurality of recesses around it. As another example, the grip of the assembly tool 1330 may be made of a material having large friction, for example, rubber.

Figure 14:
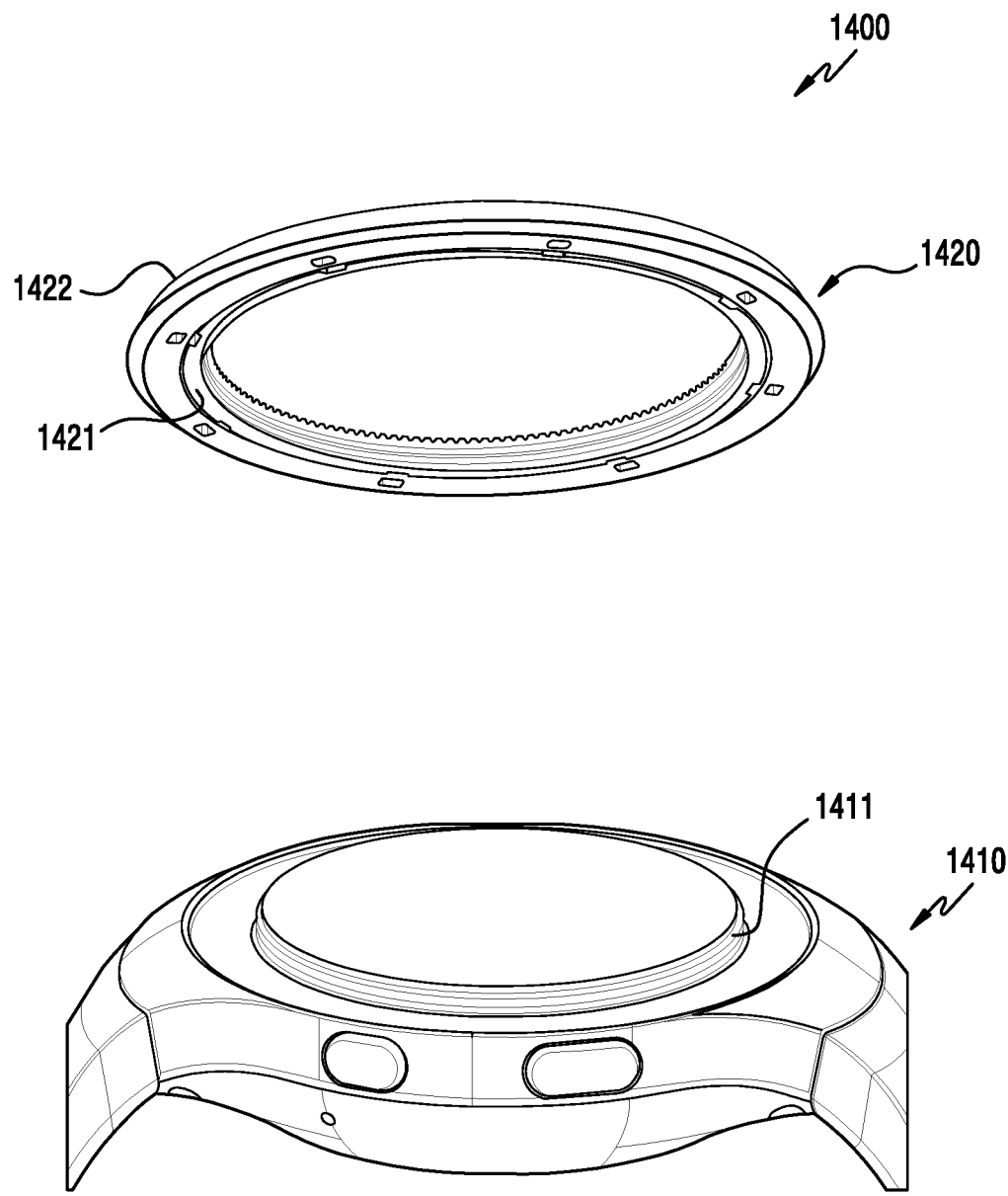
FIG. 14 shows another example of a coupling structure of a housing and a detachable input device according to an embodiment.

FIG. 14 shows another example of a coupling structure of a housing and a detachable input device according to an embodiment.

Referring to FIG. 14, an electronic device 1400 according to another embodiment may be assembled by thread-fastening a housing 1410 and a detachable input device 1420. For example, a first ring-shaped member 1421 of the detachable input device 1420 may have female threads on the inner side. The housing 1410 may have a securing portion 1411 protruding from the top of the housing 1410. The securing portion 1411 may have male treads on the outer side corresponding to the female threads. Accordingly, the detachable input device 1420 can be combined with the housing 1410 by securing the first ring-shaped member 1421 and the securing portion 1411 through thread-fastening. According to another embodiment, alternatively, the securing portion 1411 may have female threads on the inner side and the first ring-shaped member 1421 may have male threads on the outer side.

Figure 15:
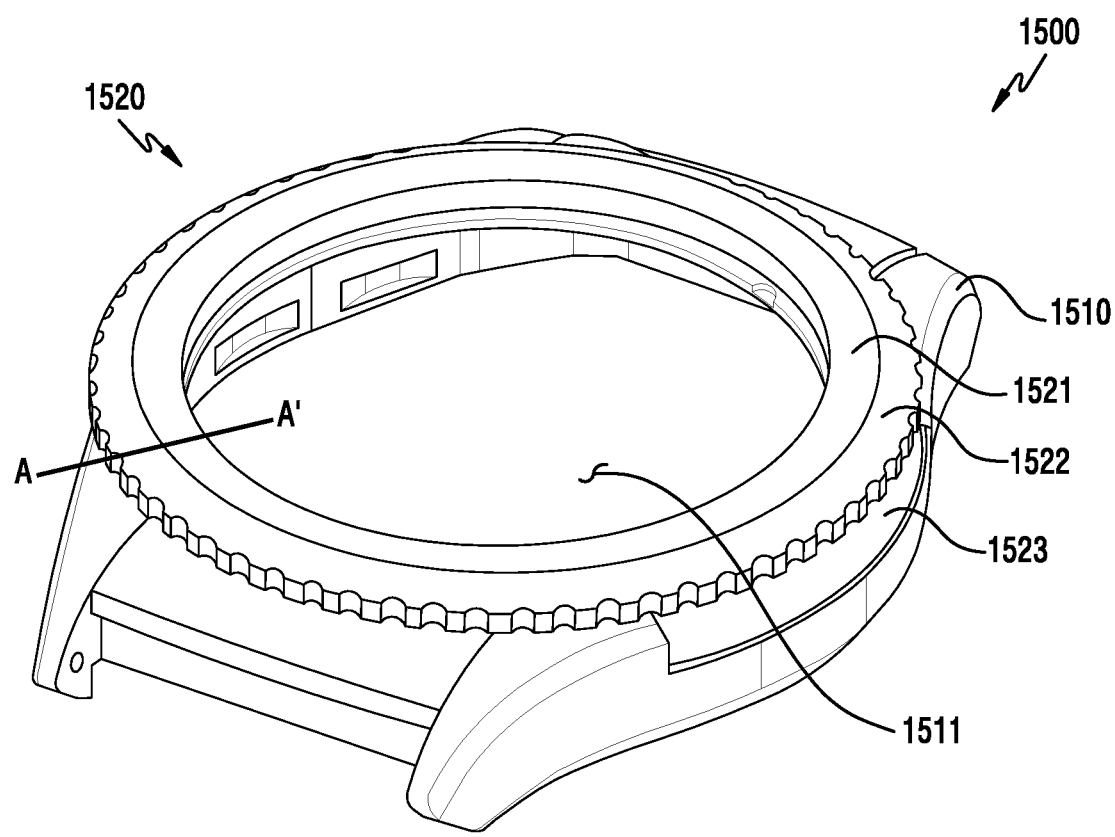
FIG. 15 is a perspective view of an electronic device according to an embodiment.

FIG. 15 is a perspective view of an electronic device according to an embodiment.

Referring to FIG. 15, an electronic device 1500 according to an embodiment may be assembled by coupling a detachable input device 1520 to a front housing 1510. The detachable input device 1520 may include a first ring-shaped member 1521 detachably coupled to the front housing 1510 and a second ring-shaped member 1522 configured to be rotatable with respect to the first ring-shaped member 1521. The second ring-shaped member 1522 may further have an extended part 1523 protruding downward to be at least partially inserted in the front housing 1510. According to an embodiment, the front housing 1510 may be configured such that at least a portion of the extended part 1523 is exposed on the outer side of the front housing 1510. According to another embodiment, the front housing 1510 may be configured to surround the entire extended part 1523 to prevent the extended part 1523 from being exposed.

Figure 16:
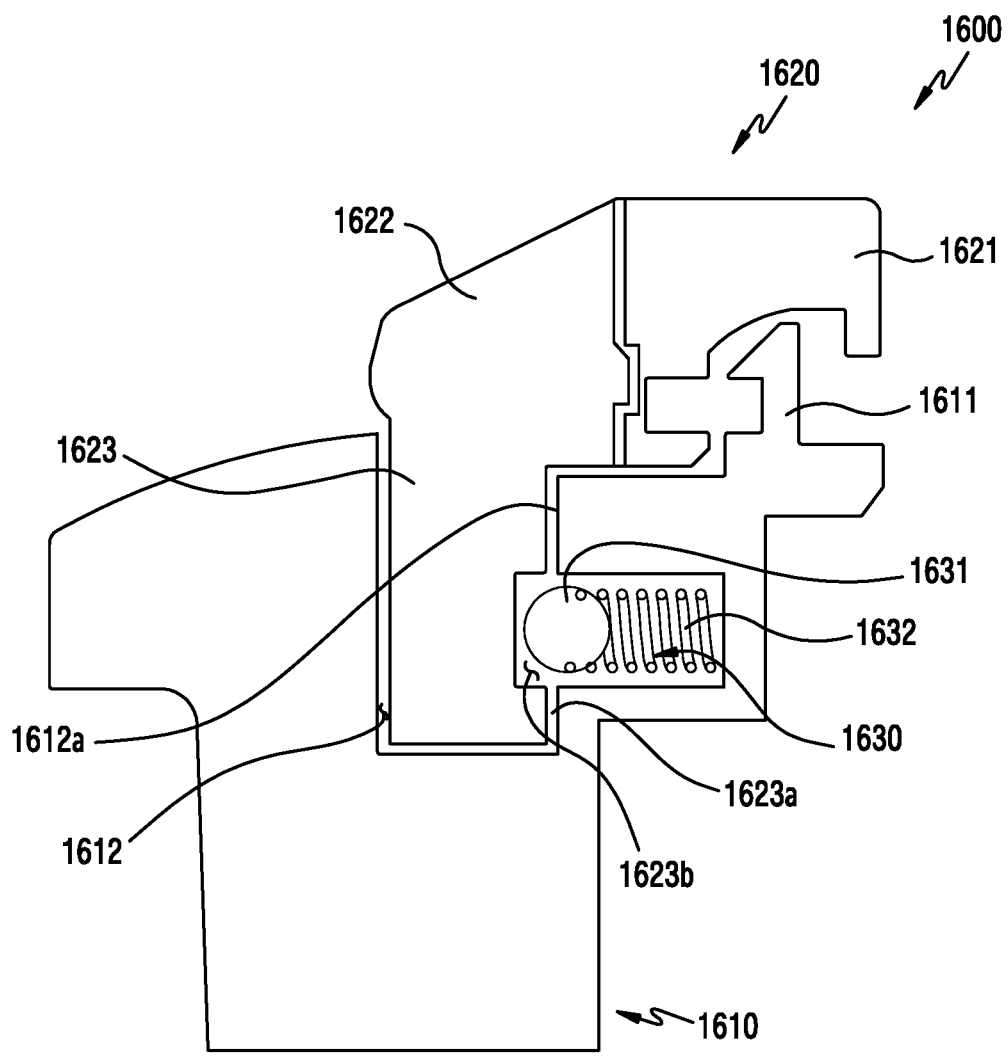
FIG. 16 is a cross-sectional view showing a structure of implementing tactile feedback of an electronic device according to an embodiment.

FIG. 16 is a cross-sectional view taken along line A-A' shown in FIG. 15 according to an embodiment. A structure for implementing tactile feedback according to an embodiment may be described with reference to FIG. 16. An electronic device 1600 shown in FIG. 16 may include configuration the same as or similar to that of the electronic device 1500 shown in FIG. 15.

Referring to FIG. 16, an electronic device 1600 according to an embodiment may be assembled by combining a front housing 1610 and a detachable input device 1620. The detachable input device 1620 may include a first ring-shaped member 1621 and a second ring-shaped member 1622. The first ring-shaped member 1621 may be detachably coupled to a securing portion 1611 formed on the front housing 1610. The coupling structure of the first ring-shaped member 1621 and the securing portion 1611 may include the hook coupling structure or the thread-fastening structure described above.

The second ring-shaped member 1622 according to this embodiment may have an extended part 1623 formed to be at least partially inserted in the front housing 1610. The front housing 1610 may have a trench 1612 (or a groove) in which the extended part 1623 can be received. For example, the trench 1612 may be formed around an opening (for example, 1511 in FIG. 15) of the front housing 1610. Accordingly, the trench 1612 can provide a space in which the extended part 1623 can be rotated when the second ring-shaped member 1622 is rotated.

The electronic device 1600 according to this embodiment may further include a side elastic structure for providing tactile feedback to the user when the second ring-shaped member 1622 is rotated. For example, the extended part 1623 of the second ring-shaped member 1622 may have one or more stopper grooves 1623b around the inner side 1623a. The front housing 1610 may have one or more ball units 1630 on the inner side 1612a of the trench 1612 facing the inner side 1623a of the extended part 1623. The ball units 1630 may be arranged on a path along which the stopper grooves 1623b of the extended part 1623 are rotated when the second ring-shaped member 1622 is rotated. For example, the ball units 1630 each may include a ball 1631 and an elastic member 1632 (for example, a spring). In one embodiment, the balls 1631 can be pressed to the inner side 1623a of the extended part 1623 by the elastic members 1632. Accordingly, when the second ring-shaped member 1622 is rotated, the balls 1631 can be repeatedly inserted into and separated out of the stopper grooves 1623b on the inner side 1623a. By this operation, a user can feel tactile feedback when the second ring-shaped member 1622 of the detachable input device 1620 is rotated.

Figure 17:
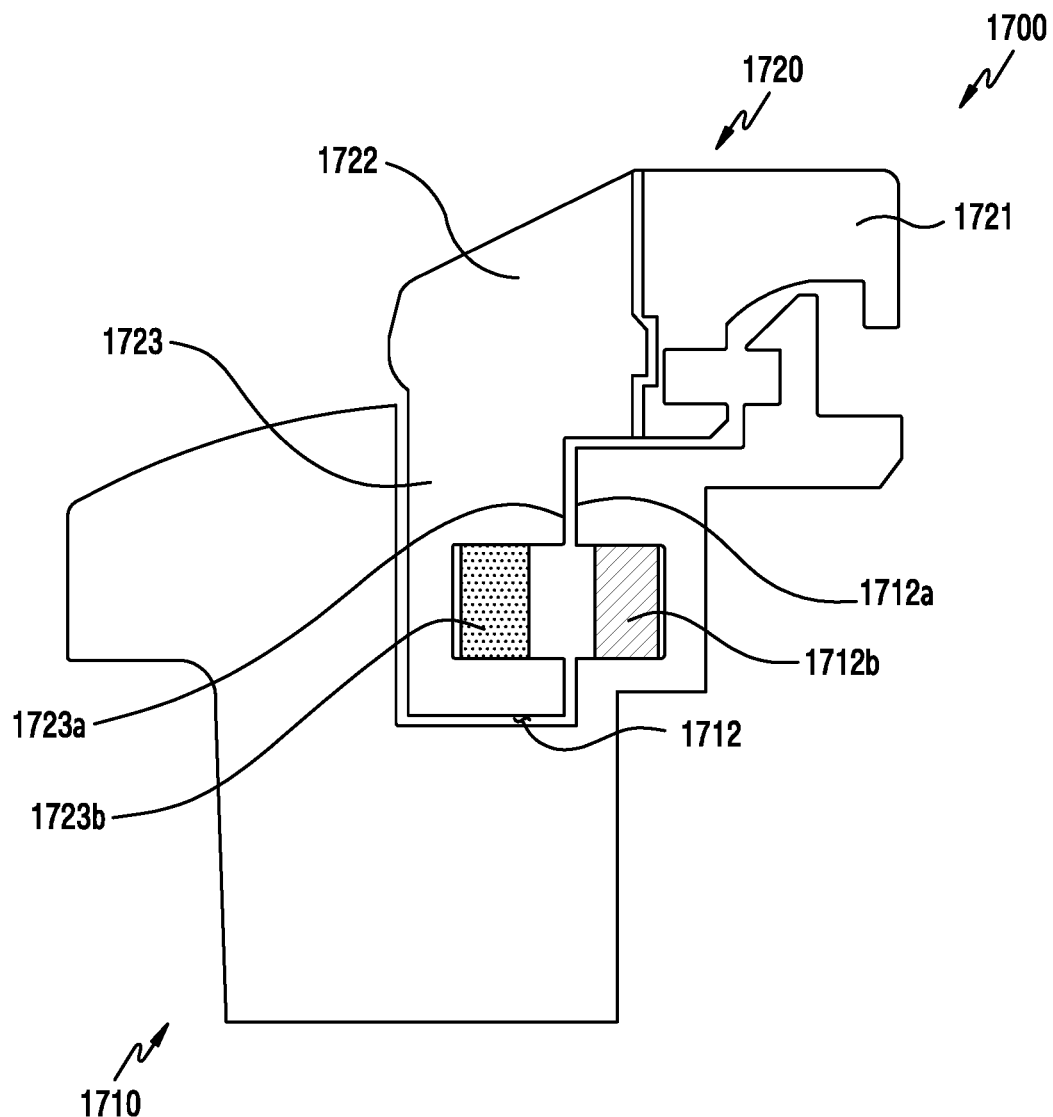
FIG. 17 is a cross-sectional view showing a structure of implementing tactile feedback of an electronic device according to another embodiment.

FIG. 17 is a cross-sectional view taken along line A-A' shown in FIG. 15 according to another embodiment. Another structure of implementing tactile feedback according to an embodiment may be described with reference to FIG. 17. An electronic device 1700 shown in FIG. 17 may include a configuration the same as or similar to that of the electronic device shown in FIG. 15 or 16 and the configuration may not be described.

Referring to FIG. 17, the electronic device 1700 according to an embodiment can provide tactile feedback to the user using magnetic elements. According to an embodiment, the second ring-shaped member 1722 may include a plurality of first magnetic elements 1723b disposed inside an extended part 1723. A front housing 1710 may include a plurality of second magnetic elements 1712b disposed along a rotational path of the first magnetic elements 1723b that are rotated when the second ring-shaped member 1722 is rotated. For example, the first magnetic elements 1723b may be arranged at regular intervals around the inner side 1723a of the extended part 1723. The second magnetic elements 1712b may be arranged at regular intervals around the inner side 1712a of a trench 1712 of the front housing 1710. Accordingly, a user can feel tactile feedback from the magnetism (attraction or repulsion) between the first magnetic elements 1723*b* and the second magnetic elements 1712*b* when rotating the second ring-shaped member 1722. According to an embodiment, the first magnetic elements 1723*b* and the second magnetic elements 1712*b* may have the same polarity, so that they apply repulsion to each other when they are rotated. According to another embodiment, the first magnetic elements 1723*b* and the second magnetic elements 1712*b* may have different polarities, so that they attract each other when they are rotated. According to another embodiment, the second magnetic elements 1712*b* may be arranged on the front housing 1710 such that different polarities are alternately disposed to alternately apply attraction and repulsion when the second ring-shaped member 1722 is rotated. That is, according to various embodiments, the first magnetic elements 1723*b* and the second magnetic elements 1712*b* may be ones of N-pole and S-pole magnets or may be combinations of them.

Figure 18:
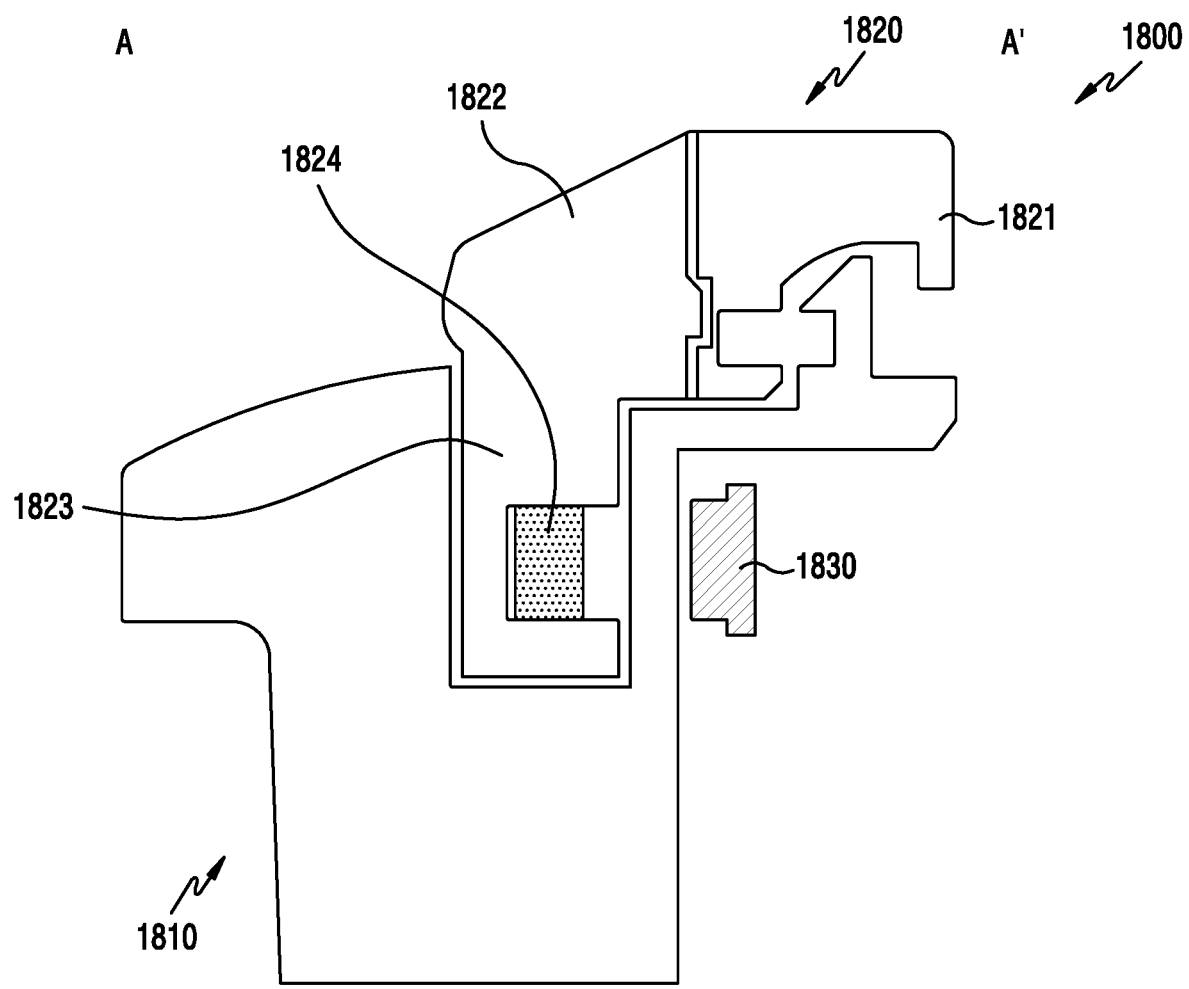
FIG. 18 is a cross-sectional view showing a sensor for detecting magnetic elements of an electronic device according to an embodiment.

FIG. 18 is a cross-sectional view taken along line A-A' shown in FIG. 15 according to an embodiment. A sensor structure for detecting magnetic elements of an electronic device according to an embodiment may be described with reference to FIG. 18. An electronic device 1800 shown in FIG. 18 may include a configuration the same as or similar to that of the electronic device shown in FIG. 15 or 16 and the configuration may not be described.

Referring to FIG. 18, an electronic device 1800 according to an embodiment may include a side sensor structure that can detect rotation of a detachable input device 1820. According to an embodiment, the detachable input unit 1820 may include one or more magnetic elements 1824. The detachable input device 1820 may include a second ring-shaped member 1822 that can be rotated in accordance with input by the user. The second ring-shaped member 1822 may have an extended part 1823 extending to be partially inserted in the front housing 1810. The magnetic elements 1824 may be disposed in the extended part 1823 to face the center of the housing (for example, the center of the opening 1511 shown in FIG. 15). According to an embodiment, the front housing 1810 may include one or more sensor modules 1830. For example, the magnetic elements 1824 may be disposed in the front housing 1810 at positions corresponding to a rotational path along which the magnet elements are moved with rotation of the second ring-shaped member 1822.

According to this embodiment, the sensor modules 1830 can detect rotation of the second ring-shaped member 1822 by detecting the magnetic fields of the magnetic elements 1824 that are rotated with rotation of the second ring-shaped member 1822. For example, the sensor modules 1830 may include hall IC sensors. The magnetic elements 1824 may be arranged at regular intervals in the circumferential direction of the extended part 1823 (for the second ring-shaped member 1822). For example, eight magnetic elements 1824 may be arranged at regular angular intervals (45 degrees).

An electronic device according to various embodiments may include: a housing having a first side facing a first direction, a second side facing a second direction opposite to the first direction, and a side surrounding at least a portion of a space between the first side and the second side; a display disposed on the first side of the housing; a detachable input device disposed to surround the display on the first side; and a coupling structure that detachably couples the detachable input device to the housing.

In the electronic device according to an embodiment, the housing may include an opening formed through the first side of the housing and a protrusion extending in the first direction from the edge of the opening, and the display may be disposed in the opening.

In the electronic device according to an embodiment, the coupling structure may be disposed between the protrusion and the detachable input device.

In the electronic device according to an embodiment, the coupling structure may include one or more first hook structures securing the detachable input device to prevent the detachable input device from separating in the first direction from the housing, and one or more second hook structures securing the detachable input device to prevent the detachable input device from separating in the circumferential direction of the opening from the housing.

In the electronic device according to an embodiment, the detachable input device may be vertically coupled to the one or more first hook structures and is locked to the one or more first hook structures by a rotation in the circumferential direction, and the detachable input device is secured by the one or more second hook structures when rotated at a predetermined angle with respect to the housing in the circumferential direction.

In the electronic device according to an embodiment, the detachable input device may include a first ring-shaped member detachably coupled to the housing and a second ring-shaped member coupled to the first ring-shaped member and is rotatable in the circumferential direction of the opening with respect to the outer side of the first ring-shaped member.

In the electronic device according to an embodiment, the detachable input device may include: one or more elastic members disposed between the first ring-shaped member and the second ring-shaped member and secured to the second ring-shaped member; and balls coupled to the elastic members and in contact with the outer side of the first ring-shaped member, in which the elastic members may press the balls to the first ring-shaped member in the radial direction toward the center of the detachable input device.

In the electronic device according to an embodiment, the elastic members may be formed to have a shape that elastically presses the balls in the radial direction toward the center of the detachable input device.

In the electronic device according to an embodiment, the elastic members may include spring members that press the balls in the radial direction toward the center of the detachable input device.

In the electronic device according to an embodiment, the detachable input device may include wheels disposed between the first ring-shaped member and the second ring-shaped member, and connecting portions connect the wheels to the second ring-shaped member, in which the wheels are rotated on the outer side of the first ring-shaped member to allow the second ring-shaped member to rotate in the circumferential direction with respect to the first ring-shaped member.

In the electronic device according to an embodiment, the first ring-shaped member may have a plurality of stopper grooves arranged at regular intervals in the circumferential direction on the outer side and the balls may be periodically inserted in the stopper grooves when the second ring-shaped member is rotated, so as to provide a tactile feedback of the rotation of the second ring-shaped member to a user.

In the electronic device according to an embodiment, the detachable input device may include magnetic elements and the magnetic elements may be arranged at regular intervals on the detachable input device in the circumferential direction of the detachable input device.

In the electronic device according to an embodiment, the housing may further include one or more sensors, the one or more sensors configured to may detect rotation of the magnetic elements when the detachable input device is rotated.

The electronic device according to an embodiment may include one or more processors and the one or more processors may be configured to change contents displayed on the display based on the detected rotation of the magnetic elements.

The electronic device according to an embodiment may further include one or more connecting members detachably coupled on a portion of a human body and coupled to the housing.

A detachable input device according to an embodiment may include: a first ring-shaped member; a second ring-shaped member rotatably coupled to the first ring-shaped member and rotatable in the circumferential direction of the first ring-shaped member with respect to the first ring-shaped member; and one or more elastic members secured to the second ring-shaped member and disposed between the first ring-shaped member and the second ring-shaped member, in which the elastic members may press the first ring-shaped member in the radial direction toward the center of the first ring-shaped member.

The detachable input device according to an embodiment may include balls coupled to the elastic members and in contact with the outer side of the first ring-shaped member, in which the elastic members may press the balls in the radial direction toward the center of the first ring-shaped member.

In the detachable input device according to an embodiment, the first ring-shaped member may have a plurality of stopper grooves arranged at regular intervals in the circumferential direction on the outer side and the balls are periodically inserted in the stopper grooves when the second ring-shaped member is rotated, so as to provide a tactile feedback of the rotation of the second ring-shaped member to a user.

In the detachable input device according to an embodiment, the inner side of the first ring-shaped member may include a coupling structure configured to couple to an electronic device including a display.

The detachable input device according to an embodiment may further include a decorative member disposed on the second ring-shaped member.

The disclosed computer readable recoding medium includes magnetic media such include magnetic media, such as a hard disk, a floppy disk and a magnetic tape, optical media, such as a Compact Disc Read Only Memory (CD-ROM) and a Digital Versatile Disc (DVD), magneto-optical media, such as a floptical disk, and a hardware device specially configured to store and execute a program command, such as a Read Only Memory (ROM), a Random Access Memory (RAM) and a flash memory. In addition, the program instructions may include high class language codes, which can be executed in a computer by using an interpreter, as well as machine codes made by a compiler.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added.

The exemplary embodiments disclosed in the specification and drawings are merely presented to easily describe the technical contents of the present disclosure and help with the understanding of the present disclosure and are not intended to limit the scope of the present disclosure. Therefore, all changes or modifications derived from the technical idea of the present disclosure as well as the embodiments described herein should be interpreted to belong to the scope of the present disclosure.

What is claimed is:

1. An electronic device comprising:
a housing having a first side facing a first direction, a second side facing a second direction opposite to the first direction, and a side surrounding at least a portion of a space between the first side and the second side;
a display disposed on the first side of the housing;
a detachable input device surrounding the display on the first side; and
a coupling structure that detachably couples the detachable input device to the housing,
wherein the housing includes:
an opening formed through the first side of the housing; and
a protrusion extending in the first direction from an edge of the opening,
wherein the display is disposed in the opening,
wherein the detachable input device includes a first ring-shaped member detachably coupled to the housing and a second ring-shaped member coupled to the first ring-shaped member and is rotatable in a circumferential direction of the opening with respect to an outer side of the first ring-shaped member,
wherein the detachable input device includes:
one or more elastic members disposed between the first ring-shaped member and the second ring-shaped member, and secured to the second ring-shaped member; and
balls coupled to the elastic members and in contact with the outer side of the first ring-shaped member, and
wherein the elastic members press the balls to the first ring-shaped member in a radial direction toward a center of the detachable input device.

2. The electronic device of claim 1, wherein the coupling structure is disposed between the protrusion and the detachable input device.

3. The electronic device of claim 2, wherein the coupling structure includes:
one or more first hook structures that secure the detachable input device to prevent the detachable input device from separating in the first direction from the housing; and
one or more second hook structures that secure the detachable input device to prevent the detachable input device from separating in the circumferential direction of the opening from the housing.

4. The electronic device of claim 3, wherein the detachable input device is vertically coupled to the one or more first hook structures and is locked to the one or more first hook structures by a rotation in the circumferential direction, and the detachable input device is secured by the one or more second hook structures when rotated at a predetermined angle with respect to the housing in the circumferential direction.

5. The electronic device of claim 1, wherein the elastic members are formed to have a shape that elastically presses the balls in the radial direction toward the center of the detachable input device.

6. The electronic device of claim 1, wherein the elastic members include spring members that press the balls in the radial direction toward the center of the detachable input device.

7. The electronic device of claim 1, wherein the detachable input device further comprises:
   wheels disposed between the first ring-shaped member and the second ring-shaped member; and
   connecting portions that connect the wheels to the second ring-shaped member, and
   the wheels are rotated on the outer side of the first ring-shaped member to allow the second ring-shaped member to rotate in the circumferential direction with respect to the first ring-shaped member.

8. The electronic device of claim 1, wherein the first ring-shaped member has a plurality of stopper grooves arranged at regular intervals in the circumferential direction on the outer side and the balls are periodically inserted in the stopper grooves when the second ring-shaped member is rotated, so as to provide a tactile feedback of the rotation of the second ring-shaped member to a user.

9. The electronic device of claim 1, wherein the detachable input device includes magnetic elements and the magnetic elements are arranged at regular intervals on the detachable input device in a circumferential direction of the detachable input device.

10. The electronic device of claim 9, wherein the housing further includes one or more sensors, the one or more sensors detect rotation of the magnetic elements when the detachable input device is rotated.

11. The electronic device of claim 10, further comprising one or more processors,
   wherein the one or more processors are configured to change contents displayed on the display based on the detected rotation of the magnetic elements.

12. The electronic device of claim 1, further comprising one or more connecting members detachably coupled on a portion of a human body and coupled to the housing.

13. A detachable input device comprising:
   a first ring-shaped member;
   a second ring-shaped member rotatably coupled to the first ring-shaped member and rotatable in a circumferential direction of the first ring-shaped member with respect to the first ring-shaped member;
   one or more elastic members secured to the second ring-shaped member, and disposed between the first ring-shaped member and the second ring-shaped member; and
   balls coupled to the elastic members and in contact with an outer side of the first ring-shaped member,
   wherein the elastic members press the first ring-shaped member in a radial direction toward a center of the first ring-shaped member, and
   wherein the elastic members press the balls in the radial direction toward the center of the first ring-shaped member.

14. The detachable input device of claim 13, wherein the first ring-shaped member has a plurality of stopper grooves arranged at regular intervals in the circumferential direction on the outer side and the balls are periodically inserted in the stopper grooves when the second ring-shaped member is rotated, so as to provide a tactile feedback of the rotation of the second ring-shaped member to a user.

15. The detachable input device of claim 13, wherein an inner side of the first ring-shaped member includes a coupling structure configured to couple to an electronic device including a display.

16. The detachable input device of claim 13, further comprising a decorative member disposed on the second ring-shaped member.

* * * * *